US008836326B2

(12) United States Patent
Maeda et al.

(10) Patent No.: US 8,836,326 B2
(45) Date of Patent: Sep. 16, 2014

(54) ROTATION ANGLE DETECTION DEVICE

(75) Inventors: Shingo Maeda, Okazaki (JP); Takeshi Ueda, Kashiba (JP)

(73) Assignee: JTEKT Corporation, Osaka (JP)

( * ) Notice: Subject to any disclaimer, the term of this patent is extended or adjusted under 35 U.S.C. 154(b) by 205 days.

(21) Appl. No.: 13/408,233

(22) Filed: Feb. 29, 2012

(65) Prior Publication Data

US 2012/0229126 A1   Sep. 13, 2012

(30) Foreign Application Priority Data

Mar. 9, 2011   (JP) .................. 2011-051639

(51) Int. Cl.
*G01D 5/245* (2006.01)
*G01D 5/14* (2006.01)
*G01D 5/244* (2006.01)

(52) U.S. Cl.
CPC .......... *G01D 5/24485* (2013.01); *G01D 5/2455* (2013.01); *G01D 5/145* (2013.01)
USPC .................................................... 324/207.25

(58) Field of Classification Search
None
See application file for complete search history.

(56) References Cited

U.S. PATENT DOCUMENTS

| 5,894,678 | A | 4/1999 | Masreliez et al. | |
| 6,930,423 | B2 * | 8/2005 | Kitazawa | 310/168 |
| 7,009,389 | B2 * | 3/2006 | Nakano et al. | 324/207.25 |
| 2006/0012324 | A1 * | 1/2006 | Eskritt et al. | 318/437 |
| 2010/0026282 | A1 * | 2/2010 | Kaita et al. | 324/207.25 |
| 2010/0066352 | A1 * | 3/2010 | Takahashi | 324/207.25 |
| 2011/0043197 | A1 * | 2/2011 | Trontelj | 324/207.25 |

FOREIGN PATENT DOCUMENTS

| JP | A-06-109750 | 4/1994 |
| JP | H-08-266084 | 10/1996 |
| JP | A-2007-093569 | 4/2007 |
| WO | WO 00/04339 A1 | 1/2000 |
| WO | WO 2009/052537 A1 | 4/2009 |

OTHER PUBLICATIONS

May 15, 2014 Extended European Search Report issued in European Patent Application No. 12158139.1.

* cited by examiner

*Primary Examiner* — Arleen M Vazquez
*Assistant Examiner* — Nichole Nguyen
(74) *Attorney, Agent, or Firm* — Oliff PLC

(57) ABSTRACT

When the zero-crossing of one of the output signals of magnetic sensors has been detected, a rotation angle computing device identifies a magnetic pole sensed by the first magnetic sensor based on the other two output signals. Subsequently, the rotation angle computing device identifies the magnetic pole sensed by the second magnetic sensor and the magnetic pole sensed by the third magnetic sensor based on the magnetic pole sensed by the first magnetic sensor. After that, the rotation angle computing device corrects the amplitude of the output signal of each magnetic sensor based on the identified magnetic poles respectively sensed by the magnetic sensors. Then, the rotation angle computing device computes the electric angle $\theta e$ of the rotor based on the corrected output signals.

5 Claims, 11 Drawing Sheets

FIG. 4

| POLE NUMBER | PEAK VALUE OF V1 | PEAK VALUE OF V2 | PEAK VALUE OF V3 |
|---|---|---|---|
| 1 | P1(1) | P2(1) | P3(1) |
| 2 | P1(2) | P2(2) | P3(2) |
| 3 | P1(3) | P2(3) | P3(3) |
| 4 | P1(4) | P2(4) | P3(4) |
| 5 | P1(5) | P2(5) | P3(5) |
| 6 | P1(6) | P2(6) | P3(6) |
| 7 | P1(7) | P2(7) | P3(7) |
| 8 | P1(8) | P2(8) | P3(8) |

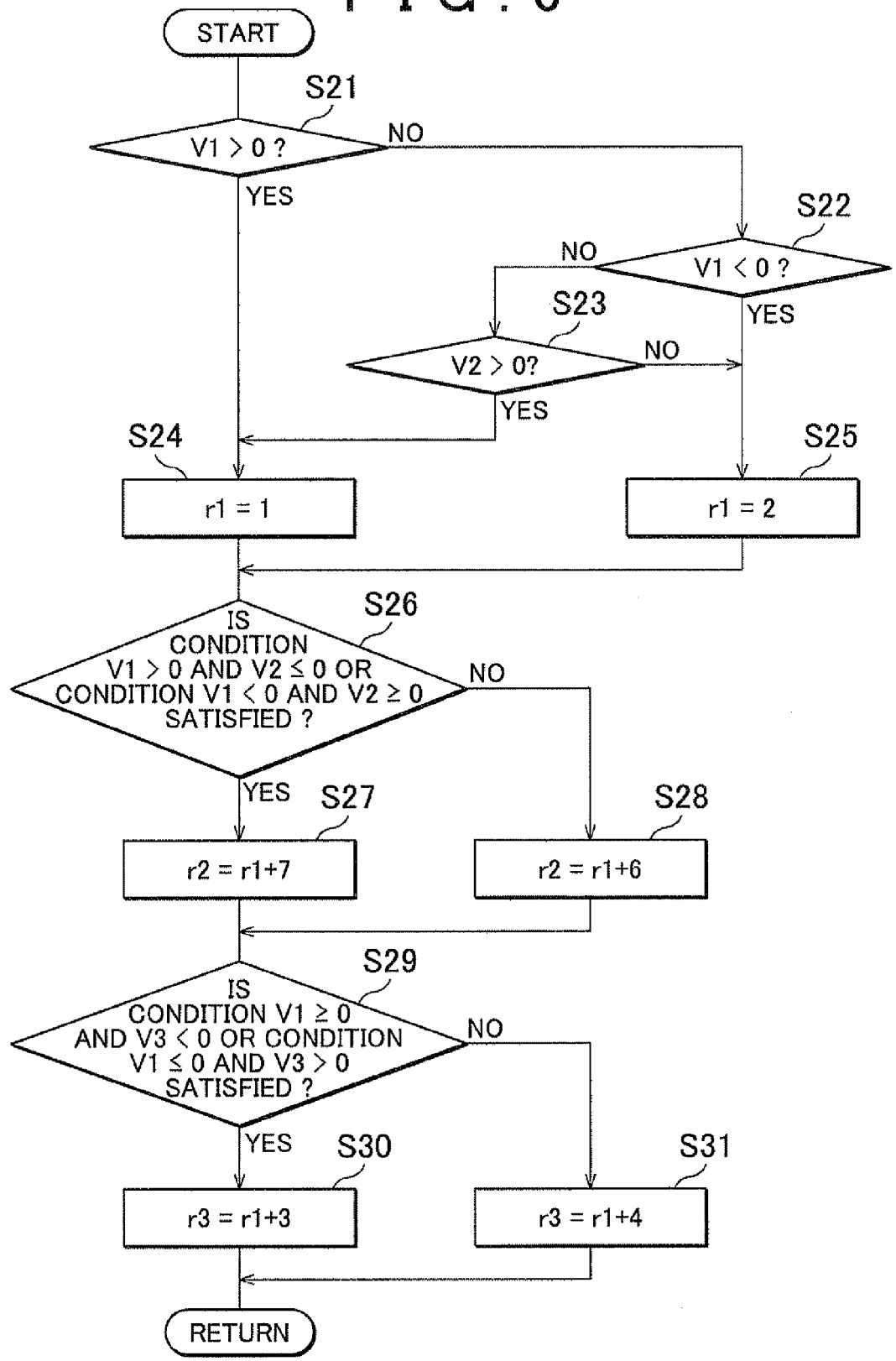

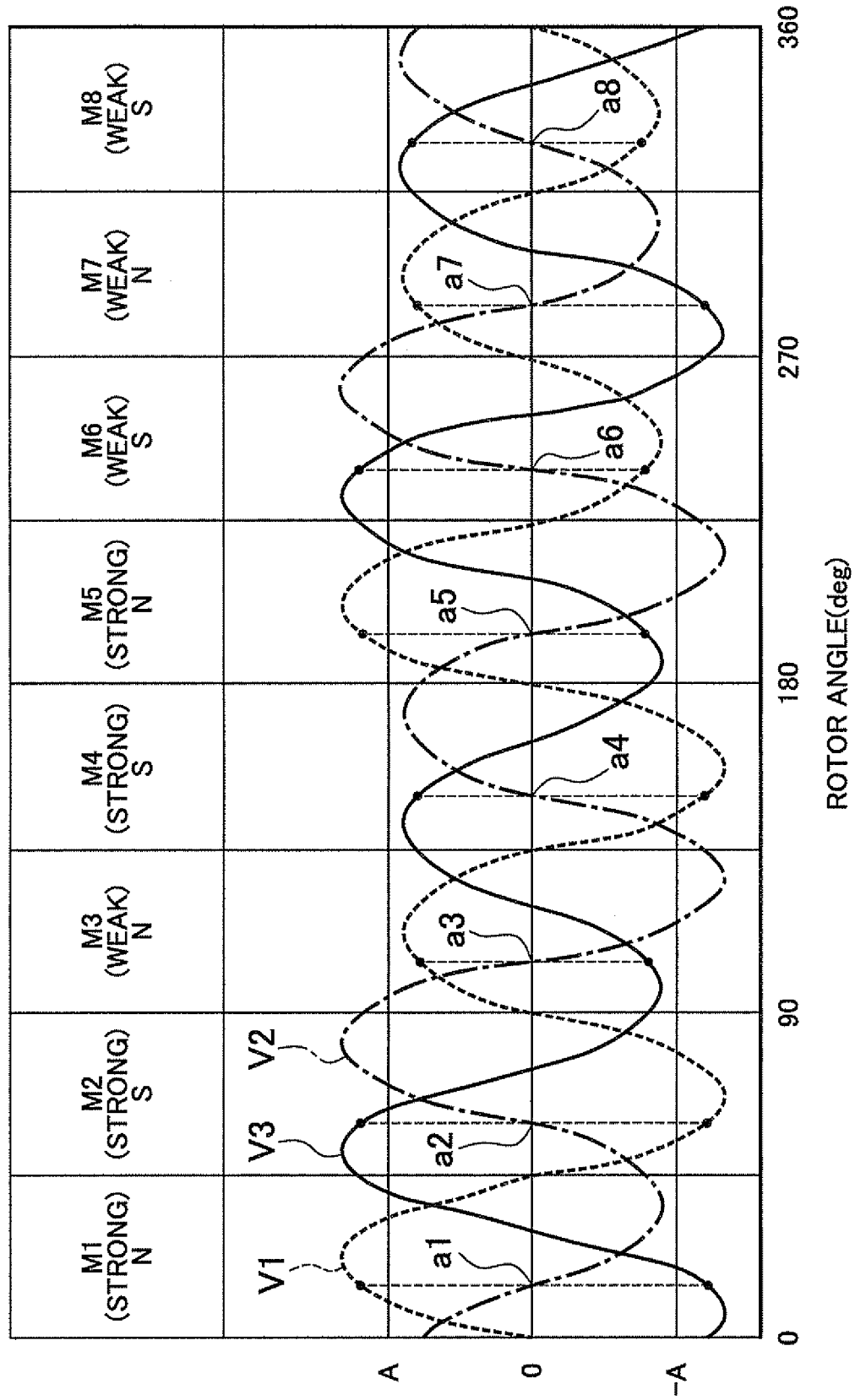

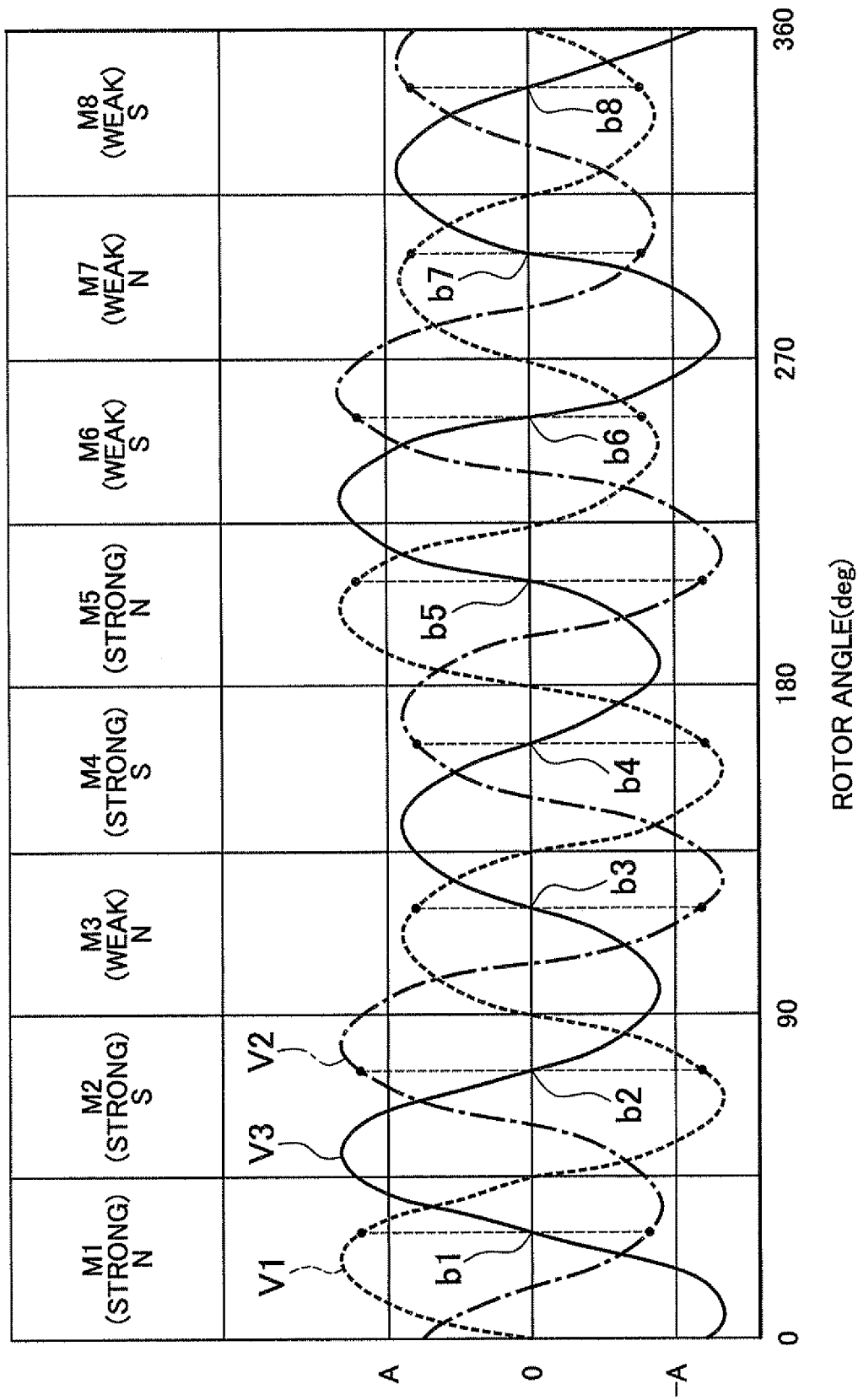

ROTATION ANGLE DETECTION DEVICE

INCORPORATION BY REFERENCE

The disclosure of Japanese Patent Applications No. 2011-051639 filed on Mar. 9, 2011 including the specification, drawings and abstract, is incorporated herein by reference in its entirety.

BACKGROUND OF THE INVENTION

1. Field of the Invention

The invention relates to a rotation angle detection device that detects a rotation angle of a rotor, such as a rotor of a brushless motor.

2. Description of Related Art

In order to control a brushless motor used in an electric power steering system, or the like, currents need to be conducted through stator coils in accordance with the rotation angle of a rotor. Then, there is known a rotation angle detection device that detects the rotation angle of a rotor of a brushless motor using a detection rotor that rotates with rotation of the brushless motor. Specifically, as shown in FIG. 12, a detection rotor 101 (hereinafter, referred to as "rotor 101") includes a cylindrical magnet 102 having a plurality of magnetic pole pairs that correspond to magnetic pole pairs of a rotor of a brushless motor. Two magnetic sensors 121 and 122 are arranged around the rotor 101 at a predetermined angular interval about the rotation axis of the rotor 101. The magnetic sensors 121 and 122 output sinusoidal signals having a predetermined phase difference. The rotation angle of the rotor 101 (the rotation angle of the rotor of the brushless motor) is detected based on these two sinusoidal signals (see Japanese Patent Application Publication No. 6-109750 (JP 6-109750 A)).

In this example, the magnet 102 has four magnetic pole pairs. That is, the magnet 102 has eight magnetic poles that are arranged at equiangular intervals. The magnetic poles are arranged at angular intervals of 45° (180° in electric angle) about the rotation axis of the rotor 101. In addition, the two magnetic sensors 121 and 122 are arranged at an angular interval of 22.5° (90° in electric angle) about the rotation axis of the rotor 101.

The direction indicated by the arrow in FIG. 12 is defined as the forward rotation direction of the detection rotor 101. Then, as the rotor 101 is rotated in the forward direction, the rotation angle of the rotor 101 increases, whereas, as the rotor 101 is rotated in the reverse direction, the rotation angle of the rotor 101 reduces. As shown in FIG. 13, the magnetic sensors 121 and 122 respectively output sinusoidal signals V1 and V2. During one period of each of the sinusoidal signals V1 and V2, the rotor 101 rotates an angle (90° (360° in electric angle)) corresponding to a single magnetic pole pair.

The angular range of one rotation of the rotor 101 is divided into four sections corresponding to the four magnetic pole pairs. The angle of the rotor 101, which is expressed on the condition that the start position of each section is 0° and the end position of each section is 360°, is termed the electric angle θe of the rotor 101.

Here, the first magnetic sensor 121 outputs the output signal V1 (=A1·sin θe) and the second magnetic sensor 122 outputs the output signal V2 (=A2·cos θe). A1 and A2 are amplitudes. If the amplitudes A1 and A2 of the respective output signals V1 and V2 are equal to each other, the electric angle θe of the rotor 101 may be obtained using both output signals V1 and V2 according to Equation 1 below.

$$\theta e = \tan^{-1}(\sin\theta e / \cos\theta e) \qquad \text{Equation 1}$$
$$= \tan^{-1}(V1/V2)$$

The thus obtained electric angle θe is used to control the brushless motor.

In the above-described conventional rotation angle detection device, because the amplitudes of the output signals V1 and V2 of the respective magnetic sensors 121 and 122 fluctuate from one magnetic pole to another due to, for example, variations in magnetic force among magnetic poles, an error may occur in detecting the rotation angle of the rotor 101. Therefore, the output signals V1 and V2 of the respective magnetic sensors 121 and 122 are corrected (the amplitudes are corrected) such that the amplitudes of the output signals V1 and V2 of the respective magnetic sensors 121 and 122 are equal to each other based on the mechanical angle of the rotor 101, and then the electric angle θe of the rotor 101 is computed.

When magnetic force varies among the magnetic poles, amplitude correction values used to correct the amplitudes of the output signals V1 and V2 of the respective magnetic sensors 121 and 122 by one period or half a period in the electric angle need to be changed. Therefore, to perform such amplitude correction, it is necessary to identify the magnetic poles sensed by the magnetic sensors 121 and 122. After the rotor 101 rotates 360° in mechanical angle, it is possible to identify the magnetic poles sensed by the magnetic sensors 121 and 122 based on the differences in peak value among the magnetic poles. Therefore, it is possible to perform amplitude correction based on the magnetic poles sensed by the magnetic sensors 121 and 122. However, immediately after start-up of the brushless motor, it is not possible to identify the magnetic poles sensed by the magnetic sensors 121 and 122. Therefore, it is not possible to perform amplitude correction based on the magnetic poles sensed by the magnetic sensors 121 and 122.

SUMMARY OF THE INVENTION

It is an object of the invention to provide a rotation angle detection device that is able to identify magnetic poles sensed by magnetic sensors in an early stage immediately after a rotor starts rotating.

An aspect of the invention relates to a rotation angle detection device that detects a rotation angle of a rotor. The rotation angle detection device includes: a multi-polar magnet that rotates with rotation of the rotor, and that has at least one magnetic pole having a first magnetic force and at least one magnetic pole having a second magnetic force; first, second and third magnetic sensors that respectively output first, second and third sinusoidal output signals having a predetermined phase difference with rotation of the multi-polar magnet; a zero-crossing detecting unit that detects timing of a zero-crossing of an output signal of at least one of the first, second and third magnetic sensors; and a magnetic pole identifying unit that, when the timing of the zero-crossing of the output signal of the one of the magnetic sensors has been detected by the zero-crossing detecting unit, identifies a magnetic pole, sensed by the first magnetic sensor, based on output signals of the other two magnetic sensors. An arrangement pattern of the at least one magnetic pole having the first magnetic force and the at least one magnetic pole having the second magnetic force and the phase difference are set such that, when the timing of the zero-crossing of the output signal of the one of the magnetic sensors has been detected by the zero-crossing detecting unit, a combination of values of the output signals of the other two magnetic sensors differs among the magnetic poles sensed by the first magnetic sensor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a chart that shows the details of a peak value table;

FIG. 6 is a flowchart that shows the procedure of the process of setting a relative pole number in step S3 of FIG. 5;

FIG. 8 is a chart for illustrating the first pole number identifying process that is executed when an output signal for which the zero-crossing has been detected is a second output signal V2;

FIG. 9 is a chart for illustrating the first pole number identifying process that is executed when an output signal for which the zero-crossing has been detected is a third output signal V3;

DETAILED DESCRIPTION OF EMBODIMENTS

Figure 1:
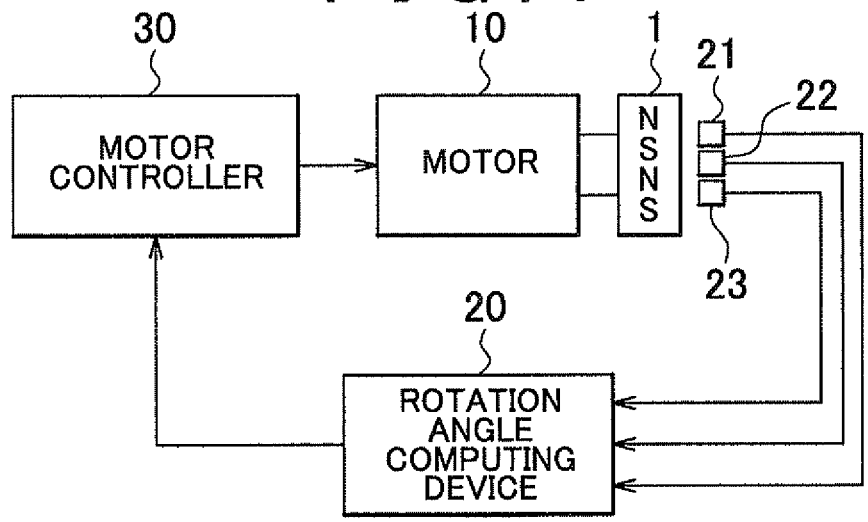
FIG. 1 is a schematic diagram that shows the configuration of a rotation angle detection device that is used to detect the rotation angle of a rotor of a brushless motor according to an embodiment of the invention.
Figure 2:
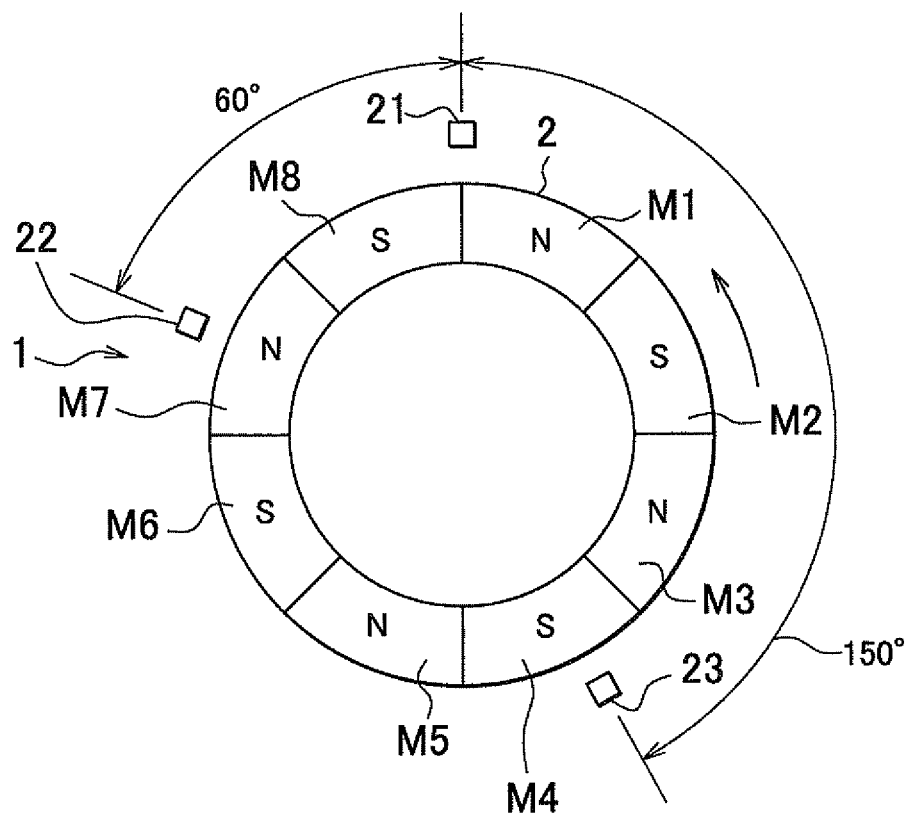
FIG. 2 is a schematic view that shows the configuration of a detection rotor.

Hereinafter, a rotation angle detection device used to detect the rotation angle of a rotor of a brushless motor according to an embodiment of the invention will be described in detail with reference to the accompanying drawings. FIG. 1 is a schematic diagram that shows the configuration of the rotation angle detection device that is used to detect the rotation angle of the rotor of the brushless motor according to the embodiment of the invention. The rotation angle detection device includes a detection rotor (hereinafter, simply referred to as "rotor 1") that rotates with rotation of the brushless motor 10. As shown in FIG. 2, the rotor 1 includes a cylindrical magnet (multi-polar magnet) 2 having a plurality of magnetic pole pairs corresponding to magnetic pole pairs of the rotor of the brushless motor 10.

The magnet 2 has four magnetic pole pairs (M1, M2), (M3, M4), (M5, M6) and (M7, M8). That is, the magnet 2 has eight magnetic poles M1 to M8 that are arranged at equiangular intervals. The magnetic poles M1 to M8 are arranged at angular intervals of 45° (180° in electric angle) about the rotation axis of the rotor 1. In this embodiment, there are two types of the magnitude of magnetic force in the magnetic poles, that is, a relatively large first magnetic force and a second magnetic force that is smaller than the first magnetic force. In this embodiment, among the eight magnetic poles M1 to M8, the magnetic forces of M1, M2, M4 and M5 are set at the first magnetic farce (strong magnetic force), and the magnetic forces of M3, M6, M7 and M8 are set at the second magnetic force (weak magnetic force).

Three magnetic sensors 21, 22 and 23 are arranged around the rotor 1. These three magnetic sensors 21, 22 and 23 may also be respectively referred to as the first magnetic sensor 21, the second magnetic sensor 22 and the third magnetic sensor 23. The second magnetic sensor 22 is arranged at a position spaced apart by 60° (240° in electric angle) from the first magnetic sensor 21 in the counterclockwise direction about the rotation axis of the rotor 1. The third magnetic sensor 23 is arranged at a position spaced apart by 150° (600° in electric angle) from the first magnetic sensor 21 in the clockwise direction about the rotation axis of the rotor 1.

In other words, the three magnetic sensors 21, 22 and 23 are arranged such that, when the first magnetic sensor 21 faces the position at 0° in electric angle in the first magnetic pole pair (M1, M2), the second magnetic sensor 22 faces the position at 120° in electric angle in the fourth magnetic pole pair (M7, M8) and the third magnetic sensor 23 faces the position at 240° in electric angle in the second magnetic pole pair (M3, M4). Each magnetic sensor may be, for example, a magnetic sensor that includes an element of which the electrical characteristic changes under the influence of a magnetic field, such as a Hall element and a magnetoresistive element (MR element).

Figure 3:
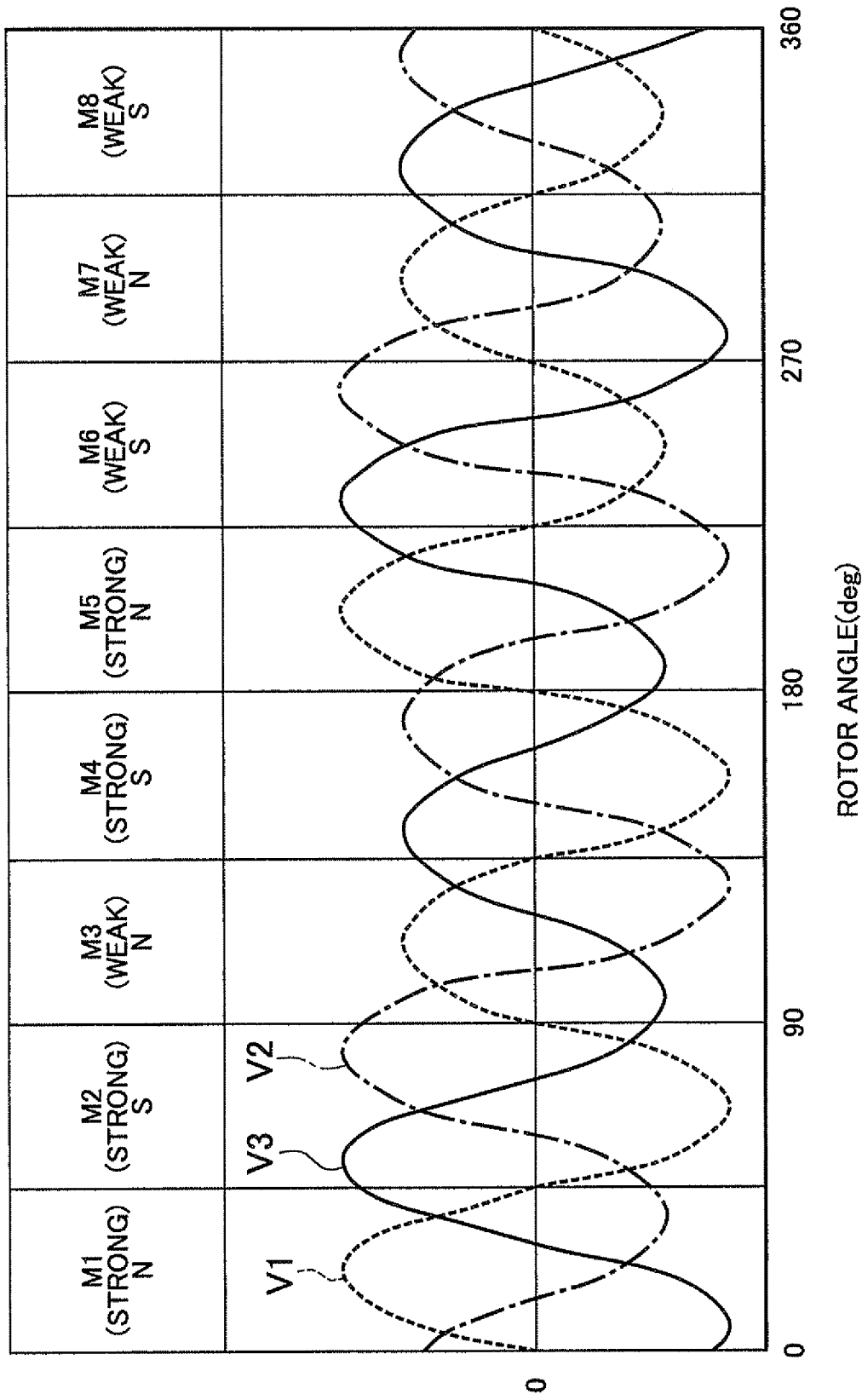
FIG. 3 is a schematic view that shows the output signal waveforms of first, second and third magnetic sensors and the magnetic pole sensed by the first magnetic sensor.

The direction indicated by the arrow in FIG. 2 is defined as the forward rotation direction of the rotor 1. As the rotor 1 is rotated in the forward direction, the rotation angle of the rotor 1 increases; whereas, as the rotor 1 rotates in the reverse direction, the rotation angle of the rotor 1 reduces. As shown in FIG. 3, the magnetic sensors 21, 22 and 23 respectively output sinusoidal signals V1, V2 and V3. During one period of each of the sinusoidal signals V1, V2 and V3, the rotor 1 rotates an angle (90° (360° in electric angle)) corresponding to a single magnetic pole pair.

FIG. 3 shows the output signals V1, V2 and V3 (sinusoidal signals V1, V2, V3) of the respective magnetic sensors 21, 22 and 23 with respect to a rotor angle (mechanical angle) in the case where the rotation angle of the rotor 1 when the boundary between the magnetic pole M8 and magnetic pole M1 of the rotor 1 faces the first magnetic sensor 21 is set at 0°. In addition, FIG. 3 shows the magnetic pole, among the magnetic poles M1 to M8, sensed by the first magnetic sensor 21 with respect to a rotor angle, and shows the magnitude of magnetic force of each of the magnetic poles M1 to M8.

The angular range of one rotation of the rotor 1 is divided into four sections corresponding to the four magnetic pole pairs. The angle of the rotor 1, which is expressed on the condition that the start position of each section is 0° and the end position of each section is 360°, is termed the electric angle $\theta e$ of the rotor 1. Here, the first magnetic sensor 21 outputs the output signal V1 ($=A1 \cdot \sin \theta e$) for each of the sections corresponding to the four magnetic pole pairs. In this case, the second magnetic sensor 22 outputs the output signal V2 ($=A2 \cdot \sin(\theta e - 240°) = A2 \cdot \sin(\theta e + 120°)$) for each of the sections corresponding to the four magnetic pole pairs. In addition, the third magnetic sensor 23 outputs the output signal V3 (=A3·sin(θe+600°)=A3·sin(θe+240)) for each of the sections corresponding to the four magnetic pole pairs. A1, A2 and A3 respectively indicate amplitudes. Note that, the amplitudes A1, A2 and A3 change according to the magnitude of magnetic force of each of the magnetic poles M1 to M8.

Thus, the magnetic sensors 21, 22 and 23 respectively output sinusoidal signals having a predetermined phase difference of 120° (electric angle). The output signals V1, V2 and V3 of the magnetic sensors 21, 22 and 23 may be termed the first output signal V1, the second output signal V2 and the third output signal V3, respectively. Referring back to FIG. 1, the output signals V1, V2 and V3 of the respective magnetic sensors 21, 22 and 23 are input into a rotation angle computing device 20. The rotation angle computing device 20 identifies the magnetic poles respectively sensed by the magnetic sensors 21, 22 and 23 based on the output signals V1, V2 and V3 of the respective magnetic sensors 21, 22 and 23. The rotation angle computing device 20 corrects the amplitudes of the output signals V1, V2 and V3 of the respective magnetic sensors 21, 22 and 23 based on the identified magnetic poles respectively sensed by the magnetic sensors 21, 22 and 23. Then, the rotation angle computing device 20 computes the electric angle θe of the rotor 1 based on the output signals of which the amplitudes have been corrected.

The electric angle θe computed by the rotation angle computing device 20 is given to a motor controller 30. The motor controller 30 uses the electric angle θe given from the rotation angle computing device 20 to control the brushless motor 10. The rotation angle computing device 20 is formed of, for example, a microcomputer, and includes a central processing unit (CPU) and memories (a ROM, a RAM, a rewritable nonvolatile memory, or the like). The nonvolatile memory of the rotation angle computing device 20 stores a peak value table for each of the magnetic sensors 21, 22 and 23.

FIG. 4 is a chart that shows the details of the peak value table. The peak value table stores, for the magnetic pole numbers 1 to 8 of the respective magnetic poles M1 to M8, the peak values (local maximum values or local minimum values) P1(1) to P1(8) of the output signal V1 of the first magnetic sensor 21, corresponding to the respective magnetic poles, the peak values (local maximum values or local minimum values) P2(1) to P2(8) of the output signal V2 of the second magnetic sensor 22, corresponding to the respective magnetic poles, and the peak values (local maximum values or local minimum values) P3(1) to P3(8) of the output signal V3 of the third magnetic sensor 23, corresponding to the respective magnetic poles. Note that because the magnetic sensors 21, 22 and 23 have substantially the same characteristics, the peak values of the output signals of the magnetic sensors 21, 22 and 23, for the same magnetic pole, are substantially the same.

The peak values are stored in the peak value table, for example, before shipment of the brushless motor 10. The peak values stored in the amplitude correction peak value table may be obtained from one-period data or may be obtained from the mean values of multi-period data.

Figure 5:
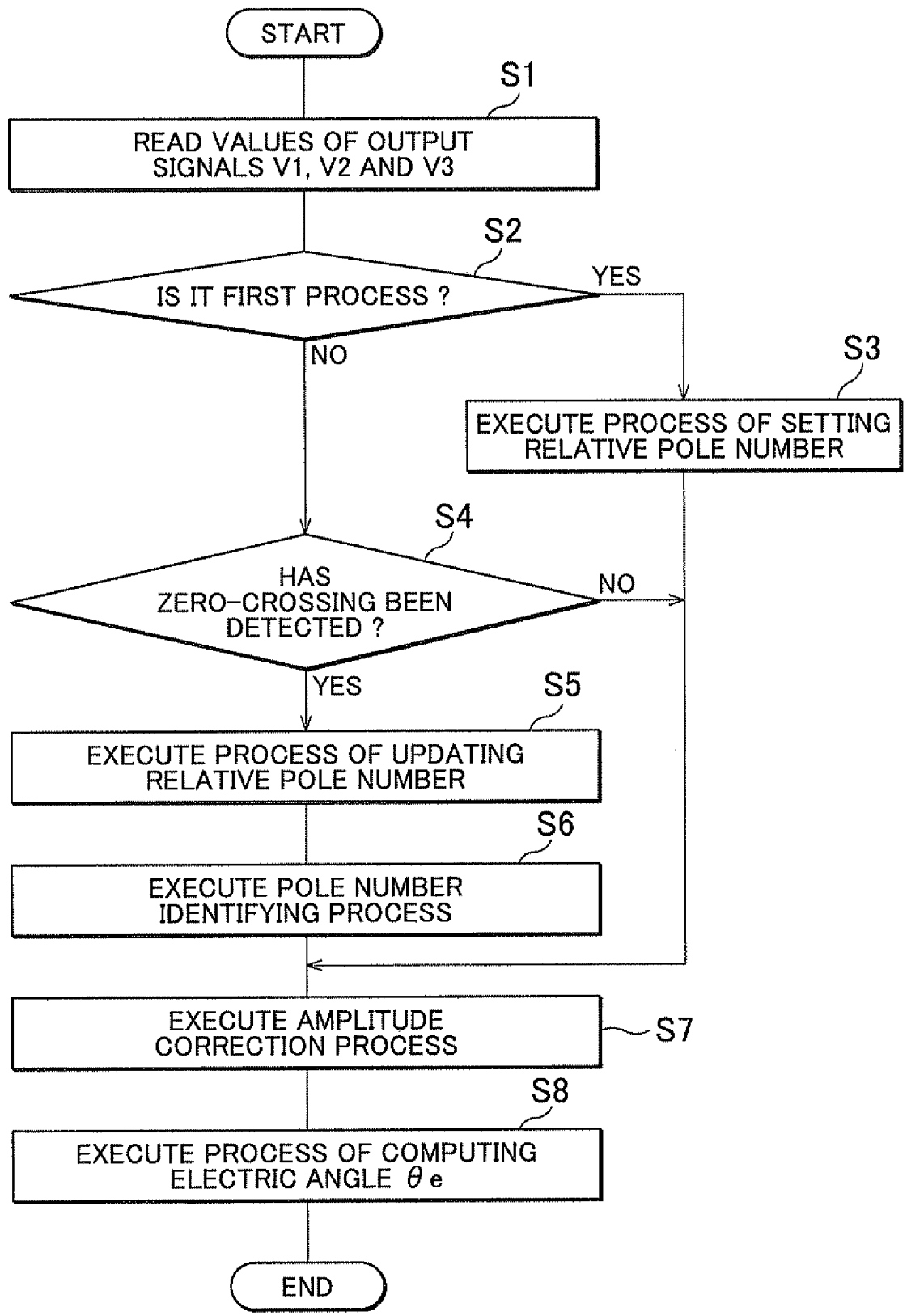
FIG. 5 is a flowchart that shows the procedure of the rotation angle computing process executed by a rotation angle computing device.

FIG. 5 is a flowchart that shows the procedure of the rotation angle computing process executed by the rotation angle computing device 20. The rotation angle computing process shown in FIG. 5 is repeatedly executed at predetermined computation intervals. A relative number, allocated to each magnetic pole using the magnetic pole sensed by the first magnetic sensor 21 at the time of the start of rotation angle computing process as a reference magnetic pole, is defined as a relative pole number. The relative pole number of the magnetic pole sensed by the first magnetic sensor 21 (hereinafter, referred to as "first relative pole number") is denoted by a variable r1, the relative pole number of the magnetic pole sensed by the second magnetic sensor 22 (hereinafter, referred to as "second relative pole number") is denoted by a variable r2, and the relative pole number of the magnetic pole sensed by the third magnetic sensor 23 (hereinafter, referred to as "third relative pole number") is denoted by a variable r3. Note that each of the relative pole numbers r1, r2 and r3 is an integer of from 1 to 8, the relative pole number smaller by one than 1 is 8, and the relative pole number larger by one than 8 is 1.

In this embodiment, when the magnetic pole sensed by the first magnetic sensor 21 at the time of the start of rotation angle computing process (reference magnetic pole) is a north pole, the relative pole number "1" is allocated to that magnetic pole. On the other hand, when the magnetic pole sensed by the first magnetic sensor 21 at the time of the start of rotation angle computing process (reference magnetic pole) is a south pole, the relative pole number "2" is allocated to that magnetic pole.

In addition, the pole number of the magnetic pole sensed by the first magnetic sensor 21 is denoted by q1, the pole number of the magnetic pole sensed by the second magnetic sensor 22 is denoted by q2, and the pole number of the magnetic pole sensed by the third magnetic sensor 23 is denoted by q3. Note that each of the pole numbers q1, q2 and q3 is an integer of from 1 to 8, the pole number smaller by one than 1 is 8, and the pole number larger by one than 8 is 1. When the rotation angle computing process is started, the rotation angle computing device 20 reads values of the output signals V1, V2 and V3 of the respective magnetic sensors 21, 22 and 23 (step S1). Note that the memory (for example, RAM) of the rotation angle computing device 20 stores the output signal values that have been read so far since the computation cycle that is multiple cycles before to the current computation cycle.

When the values of the output signals V1, V2 and V3 are read in step S1, the rotation angle computing device 20 determines whether the current process is the first process after the start of rotation angle computing process (step S2). When the current process is the first process after the start of rotation angle computing process (YES in step S2), the rotation angle computing device 20 executes the process of setting a relative pole number (step S3).

FIG. 6 shows the detailed procedure of the process of setting a relative pole number. The rotation angle computing device 20 initially determines whether the value of the first output signal V1 is larger than 0 (step S21). When the value of the first output signal V1 is larger than 0 (YES in step S21), the rotation angle computing device 20 determines that the magnetic pole sensed by the first magnetic sensor 21 (reference magnetic pole) is a north pole, and then sets the first relative pole number r1 at 1 (step S24). Then, the process proceeds to step S26.

On the other hand, when the value of the first output signal V1 is smaller than or equal to 0 (NO in step S21), the rotation angle computing device 20 determines whether the value of the first output signal V1 is smaller than 0 (step S22). When the value of the first output signal V1 is smaller than 0 (YES in step S22), the rotation angle computing device 20 determines that the magnetic pole sensed by the first magnetic sensor 21 (reference magnetic pole) is a south pole, and then sets the first relative pole number r1 at 2 (step S25). Then, the process proceeds to step S26.

When it is determined in step S22 that the value of the first output signal V1 is larger than or equal to 0 (NO in step S22), that is, when the value of the first output signal V1 is 0, the rotation angle computing device 20 determines whether the value of the second output signal V2 is larger than 0 in order to determine whether the rotor rotation angle (electric angle) is 0° or 180° (step S23). When the value of the second output signal V2 is larger than 0 (YES in step S23), the rotation angle computing device 20 determines that the rotor rotation angle (electric angle) is 0°, and then sets the first relative pole number r1 at 1 (step S24). Then, the process proceeds to step S26.

On the other hand, when the value of the second output signal V2 is smaller than or equal to 0 (NO in step S23), the rotation angle computing device 20 determines that the rotor rotation angle (electric angle) is 180°, and then sets the first relative pole number r1 at 2 (step S25). Then, the process proceeds to step S26. Note that the rotation angle computing device 20 may determine in step S23 whether the value of the third output signal V3 is smaller than 0. In this case, when the value of the third output signal V3 is smaller than 0, the rotation angle computing device 20 causes the process to proceed to step S24 and then sets the first relative pole number r1 at 1. On the other hand, when the value of the third output signal V3 is larger than or equal to 0, the rotation angle computing device 20 causes the process to proceed to step S25 and then sets the first relative pole number r1 at 2.

In step S26, the rotation angle computing device 20 determines whether the condition "V1>0 and V2≤0" or the condition "V1<0 and V2≤0" is satisfied. When the above condition is satisfied (YES in step S26), the rotation angle computing device 20 determines that the pole number of the magnetic pole sensed by the second magnetic sensor 22 is larger by seven than the pole number of the magnetic pole sensed by the first magnetic sensor 21, and sets the second relative pole number r2 at a number that is larger by seven than the first relative pole number r1 (r2=r1+7) (step S27). However, when a value obtained by adding seven to r1 (r1+7) is a value larger than or equal to nine, a value obtained by subtracting eight from that value is set as the second relative pole number r2. Then, the process proceeds to step S29.

On the other hand, when the condition of step S26 is not satisfied (NO in step S26), the rotation angle computing device 20 determines that the pole number of the magnetic pole sensed by the second magnetic sensor 22 is larger by six than the pole number of the magnetic pole sensed by the first magnetic sensor 21, and then sets the second relative pole number r2 at a number that is larger by six than the first relative pole number r1 (r2=r1+6) (step S28). Then, the process proceeds to step S29.

In step S29, the rotation angle computing device 20 determines whether the condition "V1≥0 and V3<0" or the condition "V1≤0 and V3>0" is satisfied. When the above condition is satisfied (YES in step S29), the rotation angle computing device 20 determines that the pole number of the magnetic pole sensed by the third magnetic sensor 23 is larger by three than the pole number of the magnetic pole sensed by the first magnetic sensor 21, and then sets the third relative pole number r3 at a number that is larger by three than the first relative pole number r1 (r3=r1+3) (step S30). Then, the process returns to step S7 of FIG. 5.

On the other hand, when the condition of step S29 is not satisfied (NO in step S29), the rotation angle computing device 20 determines that the pole number of the magnetic pole sensed by the third magnetic sensor 23 is larger by four than the pole number of the magnetic pole sensed by the first magnetic sensor 21, and then sets the third relative pole number r3 at a number that is larger by four than the first relative pole number r1 (r3=r1+4) (step S31). Then, the process returns to step S7 of FIG. 5.

The reason why the second relative pole number r2 is set at a number that is larger by seven than the first relative pole number r1 (r2=r1+7) when the condition of step S26 is satisfied and the second relative pole number r2 is set at a number that is larger by six than the first relative pole number r1 (r2=r1+6) when the condition of step S26 is not satisfied will be described. In addition, the reason why the third relative pole number r3 is set at a number that is larger by three than the first relative pole number r1 (r3=r1+3) when the condition of step S29 is satisfied and the third relative pole number r3 is set at a number that is larger by four than the first relative pole number r1 (r3=r1+4) when the condition of S29 is not satisfied will be described.

Figure 7A:
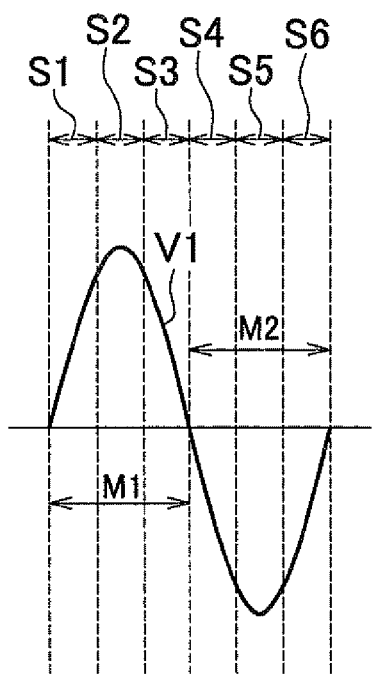
FIG. 7A to FIG. 7C are charts for illustrating the process of setting a relative pole number.
Figure 7B:
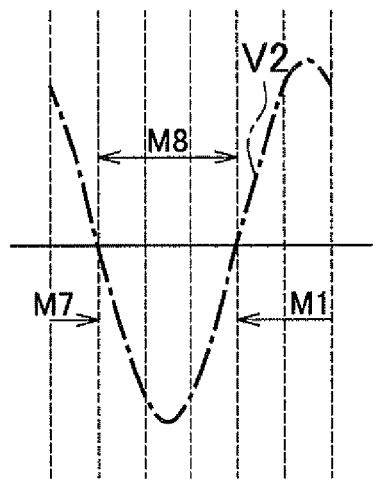
Figure 7C:
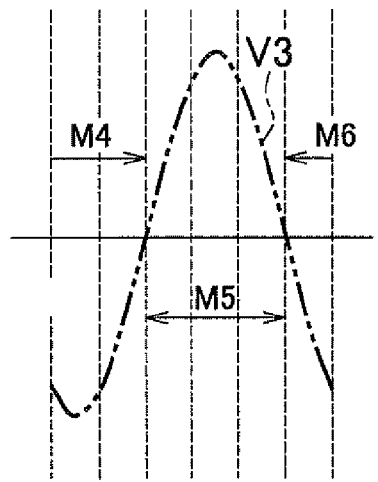

For example, FIG. 7A to FIG. 7C schematically show the signal waveforms of the output signals V1, V2 and V3 of the respective first, second and third magnetic sensors 21, 22 and 23 at the time when the magnetic pole pair formed of the magnetic pole M1 and magnetic pole M2 of the rotor 1 passes the first magnetic sensor 21. Note that, in FIG. 7A to FIG. 7C, for the sake of convenience of description, the output signals V1, V2 and V3 are shown such that their amplitudes are equal to one another.

In FIG. 7A and FIG. 7B, S1 indicates the region in which the first magnetic sensor 21 senses the magnetic pole M1 and the second magnetic sensor 22 senses the magnetic pole M7. S2 and S3 indicate the regions in which the first magnetic sensor 21 senses the magnetic pole M1 and the second magnetic sensor 22 senses the magnetic pole M8. S4 indicates the region in which the first magnetic sensor 21 senses the magnetic pole M2 and the second magnetic sensor 22 senses the magnetic pole M8. S5 and S6 indicate the regions in which the first magnetic sensor 21 senses the magnetic pole M2 and the second magnetic sensor 22 senses the magnetic pole M1.

That is, in the regions S1 and S4, the pole number of the magnetic pole sensed by the second magnetic sensor 22 is larger by six than the pole number of the magnetic pole sensed by the first magnetic sensor 21. On the other hand, in the regions S2, S3, S5 and S6, the pole number of the magnetic pole sensed by the second magnetic sensor 22 is larger by seven than the pole number of the magnetic pole sensed by the first magnetic sensor 21. In the region S1, the values of the output signals V1 and V2 satisfy the first condition that V1≥0 and V2>0. In the regions S2 and S3, the values of the output signals V1 and V2 satisfy the second condition that V1>0 and V2≤0. In the region S4, the values of the output signals V1 and V2 satisfy the third condition that V1≤0 and V2<0. In the regions S5 and S6, the values of the output signals V1 and V2 satisfy the fourth condition that V1<0 and V2≥0.

The rotation angle computing device 20 determines that the pole number of the magnetic pole sensed by the second magnetic sensor 22 is larger by seven than the pole number of the magnetic pole sensed by the first magnetic sensor 21 when the second condition (V1>0 and V2≤0) or the fourth condition (V1<0 and V2≥0) is satisfied. On the other hand, the rotation angle computing device 20 determines that the pole number of the magnetic pole sensed by the second magnetic sensor 22 is larger by six than the pole number of the magnetic pole sensed by the first magnetic sensor 21 when neither the second condition nor the fourth condition is satisfied.

In addition, in FIG. 7A and FIG. 7C, S1 and S2 indicate the regions in which the first magnetic sensor 21 senses the magnetic pole M1 and the third magnetic sensor 23 senses the magnetic pole M4. S3 indicates the region in which the first magnetic sensor 21 senses the magnetic pole M1 and the third magnetic sensor 23 senses the magnetic pole M5. S4 and S5 indicate the regions in which the first magnetic sensor 21 senses the magnetic pole M2 and the third magnetic sensor 23 senses the magnetic pole M5. S6 indicates the region in which the first magnetic sensor 21 senses the magnetic pole M2 and the third magnetic sensor 23 senses the magnetic pole M6.

That is, in the regions S1, S2, S4 and S5, the pole number of the magnetic pole sensed by the third magnetic sensor 23 is larger by three than the pole number of the magnetic pole sensed by the first magnetic sensor 21. On the other hand, in the regions S3 and S6, the pole number of the magnetic pole sensed by the third magnetic sensor 23 is larger by four than the pole number of the magnetic pole sensed by the first magnetic sensor 21. In the regions S1 and S2, the values of the output signals V1 and V3 satisfy the first condition that V1≥0 and V3<0. In the region S3, the value of the output signals V1 and V3 satisfy the second condition that V1>0 and V3≥0. In the regions 54 and S5, the values of the output signals V1 and V3 satisfy the third condition that V1≤0 and V3>0. In the region S6, the values of the output signals V1 and V3 satisfy the fourth condition that V1<0 and V3≤0.

The rotation angle computing device 20 determines that the pole number of the magnetic pole sensed by the third magnetic sensor 23 is larger by three than the pole number of the magnetic pole sensed by the first magnetic sensor 21 when the first condition (V1≥0 and V3<0) or the third condition (V1≤0 and V3>0) is satisfied. On the other hand, the rotation angle computing device 20 determines that the pole number of the magnetic pole sensed by the third magnetic sensor 23 is larger by four than the pole number of the magnetic pole sensed by the first magnetic sensor 21 when neither the first condition nor the third condition is satisfied.

Referring back to FIG. 5, when it is determined in step S2 that the current process is not the first process after the start of rotation angle computing process (NO in step S2), the process proceeds to step S4. In step S4, the rotation angle computing device 20 determines whether the zero-crossing, at which the sign of the value of an output signal is inverted, has been detected for each of the output signals V1, V2 and V3 based on the values of the output signals V1, V2 and V3 stored in the memory. When no zero-crossing has been detected (NO in step S4), the rotation angle computing device 20 causes the process to proceed to step S7.

When the zero-crossing of one of the output signals V1, V2 and V3 has been detected in step S4 (YES in step S4), the rotation angle computing device 20 executes the process of updating a relative pole number (step S5). Specifically, the rotation angle computing device 20 changes the relative pole number r1, r2 or r3 that is currently set for the magnetic sensor that outputs the output signal for which the zero-crossing has been detected in step S4, to a number larger by one or a number smaller by one based on the rotation direction of the rotor 1.

When the rotation direction of the rotor 1 is the forward direction (direction indicated by the arrow in FIG. 2), the rotation angle computing device 20 updates the relative pole number r1, r2 or r3, currently set for the magnetic sensor that outputs the output signal for which the zero-crossing has been detected in step S4, to a number larger by one. On the other hand, when the rotation direction of the rotor 1 is the reverse direction, the rotation angle computing device 20 updates the relative pole number r1, r2 or r3, currently set for the magnetic sensor that outputs the output signal for which the zero-crossing has been detected, to a number smaller by one. Note that, as described above, the relative pole number smaller by one than the relative pole number "1" is "8". In addition, the relative pole number larger by one than the relative pole number "8" is "1".

Note that the rotation direction of the rotor 1 may be determined based on the immediately preceding value and current value of the output signal for which the zero-crossing has been detected and the current value of one of the other two output signals. Specifically, when the output signal for which the zero-crossing has been detected is the first output signal V1, it is determined that the rotation direction is the forward direction (direction indicated by the arrow in FIG. 2) when the condition that "the immediately preceding value of the first output signal V1 is larger than 0, the current value of the first output signal V1 is smaller than or equal to 0 and the current value of the second output signal V2 is smaller than 0 (or the current value of the third output signal V3 is larger than 0)" or the condition that "the immediately preceding value of the first output signal V1 is smaller than 0, the current value of the first output signal V1 is larger than or equal to 0 and the current value of the second output signal V2 is larger than 0 (or the current value of the third output signal V3 is smaller than 0)" is satisfied.

On the other hand, it is determined that the rotation direction is the reverse direction when the condition that "the immediately preceding value of the first output signal V1 is larger than or equal to 0, the current value of the first output signal V1 is smaller than 0 and the current value of the second output signal V2 is larger than 0 (or the current value of the third output signal V3 is smaller than 0)" or the condition that "the immediately preceding value of the first output signal V1 is smaller than or equal to 0, the current value of the first output signal V1 is larger than 0 and the current value of the second output signal V2 is smaller than 0 (or the current value of the third output signal V3 is larger than 0)" is satisfied.

When the output signal for which the zero-crossing has been detected is the second output signal V2, it is determined that the rotation direction is the forward direction (direction indicated by the arrow in FIG. 2) when the condition that "the immediately preceding value of the second output signal V2 is larger than 0, the current value of the second output signal V2 is smaller than or equal to 0 and the current value of the first output signal V1 is larger than 0 (or the current value of the third output signal V3 is smaller than 0)" or the condition that "the immediately preceding value of the second output signal V2 is smaller than 0, the current value of the second output signal V2 is larger than or equal to 0 and the current value of the first output signal V1 is smaller than 0 (or the current value of the third output signal V3 is larger than 0)" is satisfied. On the other hand, it is determined that the rotation direction is the reverse direction when the condition that "the immediately preceding value of the second output signal V2 is larger than or equal to 0, the current value of the second output signal V2 is smaller than 0 and the current value of the first output signal V1 is smaller than 0 (or the current value of the third output signal V3 is larger than 0)" or the condition that "the immediately preceding value of the second output signal V2 is smaller than or equal to 0, the current value of the second output signal V2 is larger than 0 and the current value of the first output signal V1 is larger than 0 (or the current value of the third output signal V3 is smaller than 0)" is satisfied.

When the output signal for which the zero-crossing has been detected is the third output signal V3, it is determined that the rotation direction is the forward direction (direction indicated by the arrow in FIG. 2) when the condition that "the immediately preceding value of the third output signal V3 is larger than 0, the current value of the third output signal V3 is smaller than or equal to 0 and the current value of the first output signal V1 is smaller than 0 (or the current value of the second output signal V2 is larger than 0)" or the condition that "the immediately preceding value of the third output signal V3 is smaller than 0, the current value of the third output signal V3 is larger than or equal to 0 and the current value of the first output signal V1 is larger than 0 (or the current value of the second output signal V2 is smaller than 0)" is satisfied. On the other hand, it is determined that the rotation direction is the reverse direction when the condition that "the immediately preceding value of the third output signal V3 is larger than or equal to 0, the current value of the third output signal V3 is smaller than 0 and the current value of the first output signal V1 is larger than 0 (or the current value of the second output signal V2 is smaller than 0)" or the condition that "the immediately preceding value of the third output signal V3 is smaller than or equal to 0, the current value of the third output signal V3 is larger than 0 and the current value of the first output signal V1 is smaller than 0 (or the current value of the second output signal V2 is larger than 0)" is satisfied.

When the process of updating a relative pole number in step S5 ends, the rotation angle computing device 20 executes the pole number identifying process (step S6). In the pole number identifying process, the rotation angle computing device 20 initially executes the process for identifying the pole number q1 of the magnetic pole sensed by the first magnetic sensor 21 (hereinafter, referred to as "first pole number identifying process"). After that, the rotation angle computing device 20 executes the process for identifying the pole numbers q2 and q3 of the magnetic poles respectively sensed by the second magnetic sensor 22 and the third magnetic sensor 23 (hereinafter, referred to as "second pole number identifying process") based on the pole number q1 of the magnetic pole sensed by the first magnetic sensor 21.

The first pole number identifying process will be described. The rotation angle computing device 20 identifies the pole number q1 of the magnetic pole sensed by the first magnetic sensor 21 based on the two output signals, other than the output signal for which the zero-crossing has been detected in step S4, among the first, second and third output signals V1, V2 and V3. Note that, when the output signal for which the zero-crossing has been detected in step S4 is the first output signal V1, the rotation angle computing device 20 identifies the pole number q1 of the magnetic pole sensed by the first magnetic sensor 21 based on the immediately preceding value of the first output signal V1, the current value of the first output signal V1 and the current values of the other two output signals V2 and V3.

The first pole number identifying process executed in the case where the output signal for which the zero-crossing has been detected in step S4 is the second output signal V2 will be described with reference to FIG. 8. As shown in a1 to a8 in FIG. 8, there are eight zero-crossings of the second output signal V2 during one rotation of the rotor 1. Each of the zero-crossings a1 to a8 occurs when the first magnetic sensor 21 senses a corresponding one of the magnetic poles M1 to M8. Thus, when the zero-crossings a1 to a8 is identified, the pole number q1 of the magnetic pole sensed by the first magnetic sensor 21 is identified.

As is apparent from FIG. 8, the combination of the value of the first output signal V1 and the value of the third output signal V3 at zero-crossing varies among the zero-crossings a1 to a8. In order to identify each of the zero-crossings a1 to a8, a threshold A (A>0) is set to an intermediate value between the peak values of the output signals V1, V2 and V3 for the N magnetic poles M1 and M5 having a strong magnetic force and the peak values of the output signals V1, V2 and V3 for the N magnetic poles M3 and M7 having a weak magnetic force.

The combinations of the value of first output signal V1 and the value of the third output signal V3 at the zero-crossings a1 to a8 are as follows.
a1: V1>0 and V3<0 and |V1|>A and |V3|>A
a2: V1<0 and V3>0 and |V1|>A and |V3|>A
a3: V1>0 and V3<0 and |V1|<A and |V3|<A
a4: V1<0 and V3>0 and |V1|>A and |V3|<A
a5: V1>0 and V3<0 and |V1|>A and |V3|<A
a6: V1<0 and V3>0 and |V1|<A and |V3|>A
a7: V1>0 and V3<0 and |V1|<A and |V3|>A
a8: V1<0 and V3>0 and |V1|<A and |V3|<A
Therefore, the relationship between the combination of the value of the first output signal V1 and the value of the third output signal V3 and the magnetic pole sensed by the first magnetic sensor 21 in the case where the output signal for which the zero-crossing has been detected is the second output signal V2 is expressed by Table 1A and Table 1B.

TABLE 1A

| V1 > 0 AND V3 < 0 | | | |
|---|---|---|---|
| | | V3 | |
| | | |V3| > A | |V3| < A |
| V1 | |V1| > A | M1 | M5 |
| | |V1| < A | M7 | M3 |

TABLE 1B

| V1 < 0 AND V3 > 0 | | | |
|---|---|---|---|
| | | V3 | |
| | | |V3| > A | |V3| < A |
| V1 | |V1| > A | M2 | M4 |
| | |V1| < A | M6 | M8 |

Table 1A shows the relationship between the combination of the magnitude of the absolute value of V1 (whether V1 is larger than or smaller than the threshold A) and the magnitude of the absolute value of V3 (whether V3 is larger than or smaller than the threshold A) and the magnetic pole sensed by the first magnetic sensor 21 in the case where V1>0 and V3<0. Table 1B shows the relationship between the combination of the magnitude of the absolute value of V1 and the magnitude of the absolute value of V3 and the magnetic pole sensed by the first magnetic sensor 21 in the case where V1<0 and V3>0.

When the output signal for which the zero-crossing has been detected is the second output signal V2, the rotation angle computing device 20 identifies the pole number q1 of the magnetic pole sensed by the first magnetic sensor 21 based on the relationship between the combinations of the value of the first output signal V1 and the value of the third output signal V3 and the magnetic pole sensed by the first magnetic sensor 21, shown by Table 1A and Table 1B, and the values of the first and third output signals V1 and V3 read in the current computation cycle.

The first pole number identifying process executed in the case where the output signal for which the zero-crossing has been detected in step S4 is the third output signal V3 will be described with reference to FIG. 9. As shown in b1 to b8 in FIG. 9, there are eight zero-crossings of the third output signal V3 during one rotation of the rotor 1. Each of the zero-crossings b1 to b8 occurs when the first magnetic sensor 21 senses a corresponding one of the magnetic poles M1 to M8. Thus, when the zero-crossings b1 to b8 are identified, the pole number q1 of the magnetic pole sensed by the first magnetic sensor 21 is identified.

As is apparent from FIG. 9, the combination of the value of the first output signal V1 and the value of the second output signal V2 at zero-crossing varies among the zero-crossings b1 to b8. In order to identify each of the zero-crossings b1 to b8, a threshold A (A>0) is set to an intermediate value between the peak values of the output signals V1, V2 and V3 for the N magnetic poles M1 and M5 having a strong magnetic force and the peak values of the output signals V1, V2 and V3 for the N magnetic poles M3 and M7 having a weak magnetic force.

The combinations of the value of the first output signal V1 and the value of the second output signal V2 at the zero-crossings b1 to b8 are as follows.

b1: V1>0 and V2<0 and |V1|>A and |V2|<A
b2: V1<0 and V2>0 and |V1|>A and |V2|>A
b3: V1>0 and V2<0 and |V1|<A and |V2|>A
b4: V1<0 and V2>0 and |V1|>A and |V2|<A
b5: V1>0 and V2<0 and |V1|>A and |V2|>A
b6: V1<0 and V2>0 and |V1|<A and |V2|>A
b7: V1>0 and V2<0 and |V1|<A and |V2|<A
b8: V1<0 and V2>0 and |V1|<A and |V2|<A Therefore, the relationship between the combination of the value of the first output signal V1 and the value of the second output signal V2 and the magnetic pole sensed by the first magnetic sensor 21 in the case where the output signal for which the zero-crossing has been detected is the third output signal V3 is expressed by Table 2A and Table 2B.

TABLE 2A

V1 > 0 AND V2 < 0

|  |  | V2 | |
| --- | --- | --- | --- |
|  |  | |V2| > A | |V2| < A |
| V1 | |V1| > A | M5 | M1 |
|  | |V1| < A | M3 | M7 |

TABLE 2B

A1 < 0 AND V2 > 0

|  |  | V2 | |
| --- | --- | --- | --- |
|  |  | |V2| > A | |V2| < A |
| V1 | |V1| > A | M2 | M4 |
|  | |V1| < A | M6 | M8 |

Table 2A shows the relationship between the combination of the magnitude of the absolute value of V1 (whether V1 is larger than or smaller than the threshold A) and the magnitude of the absolute value of V2 (whether V2 is larger than or smaller than the threshold A) and the magnetic pole sensed by the first magnetic sensor 21 in the case where V1>0 and V2<0. On the other hand, Table 2B shows the relationship between the combination of the magnitude of the absolute value of V1 and the magnitude of the absolute value of V2 and the magnetic pole sensed by the first magnetic sensor 21 in the case where V1<0 and V2>0.

When the output signal for which the zero-crossing has been detected is the third output signal V3, the rotation angle computing device 20 identifies the pole number q1 of the magnetic pole sensed by the first magnetic sensor 21 based on the relationship between the combinations of the value of the first output signal V1 and the value of the second output signal V2 and the magnetic pole sensed by the first magnetic sensor 21, shown by Table 2A and Table 2B, and the values of the first and second output signals V1 and V2 read in the current computation cycle.

The first pole number identifying process executed in the case where the output signal for which the zero-crossing has been detected in step S4 is the first output signal V1 will be described with reference to FIG. 10. As shown in c1 to c8 in FIG. 10, there are eight zero-crossings of the first output signal V1 during one rotation of the rotor 1. Each of the zero-crossings c1 to c8 occurs when the first magnetic sensor 21 senses a portion near the boundary between two consecutive magnetic poles (boundary between M8 and M1 to boundary between M7 and M8). Thus, when the zero-crossings c1 to c8 are identified, the pole numbers of the two magnetic poles near the boundary sensed by the first magnetic sensor 21 are identified.

As described above, each of the zero-crossings c1 to c8 occurs when the first magnetic sensor 21 senses a portion near the boundary between two consecutive magnetic poles. Therefore, it is necessary to determine which one of the two consecutive magnetic poles is sensed by the first magnetic sensor 21. Then, which one of the two consecutive magnetic poles is sensed by the first magnetic sensor 21 is determined in consideration of the manner in which the first output signal V1 changes before and after the zero-crossing (a change from a positive value to a negative value or a change from a negative value to a positive value). Note that the manner in which the first output signal V1 changes before and after the zero-crossing is identified based on the immediately preceding value of the first output signal V1 and the current value of the first output signal V1.

Figure 10:
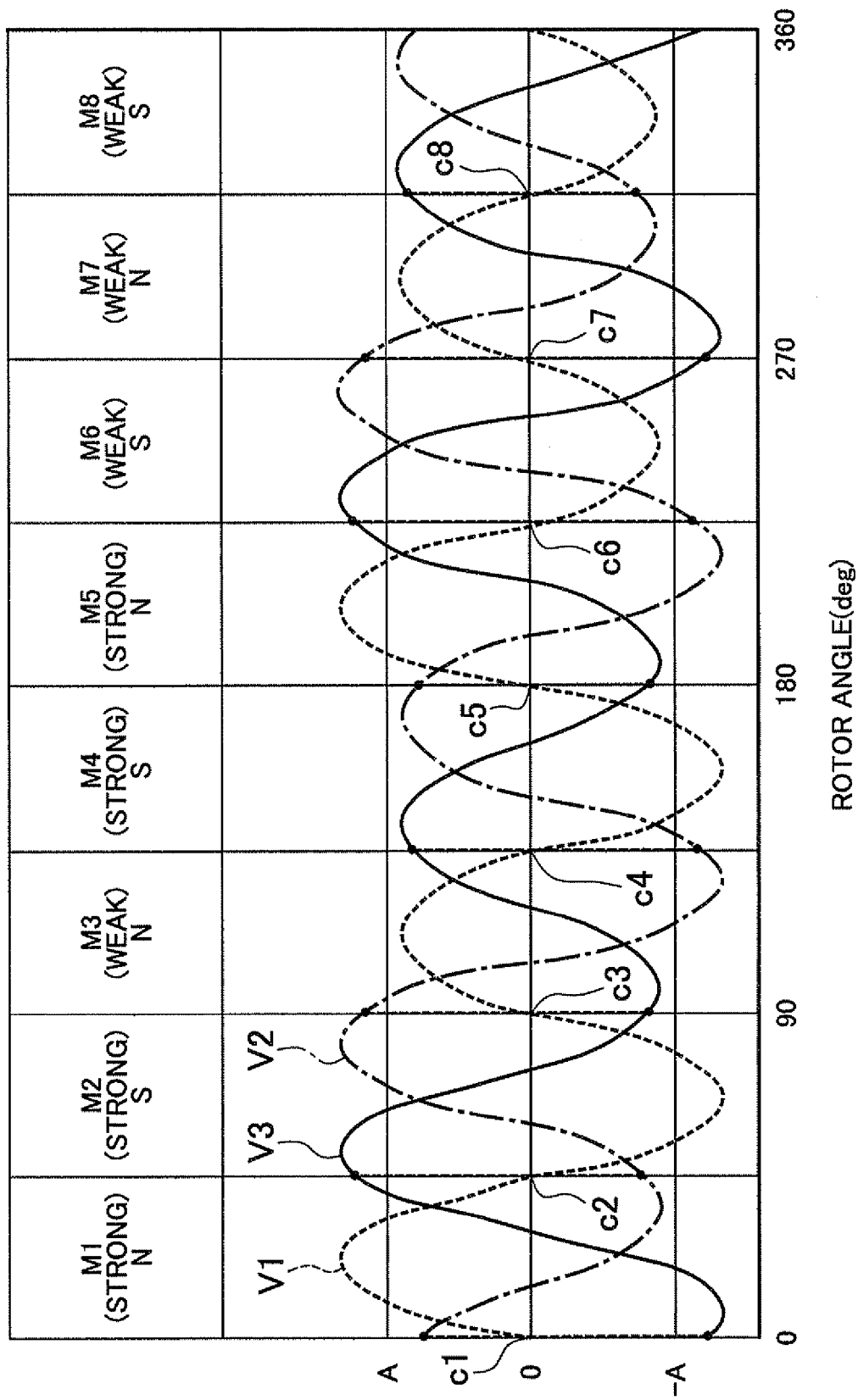
FIG. 10 is a chart for illustrating the first pole number identifying process that is executed when an output signal for which the zero-crossing has been detected is a first output signal V1.

As is apparent from FIG. 10, the combination of the value of the second output signal V2 and the value of the third output signal V3 at zero-crossing varies among the zero-crossings c1 to c8. In order to identify each of the zero-crossings c1 to c8, a threshold A (A>0) is set to an intermediate value between the peak values of the output signals V1, V2 and V3 for the N magnetic poles M1 and M5 having a strong magnetic force and the peak values of the output signals V1, V2 and V3 for the N magnetic poles M3 and M7 having a weak magnetic force.

The combinations of the value of the second output signal V2 and the value of the third output signal V3 at the zero-crossings c1 to c8 are as follows.

c1: V2>0 and V3<0 and |V2|<A and |V3|>A
c2: V2<0 and V3>0 and |V2|<A and |V3|>A
c3: V2>0 and V3<0 and |V2|>A and |V3|<A
c4: V2<0 and V3>0 and |V2|>A and |V3|<A
c5: V2>0 and V3<0 and |V2|<A and |V3|<A
c6: V2<0 and V3>0 and |V2|>A and |V3|>A
c7: V2>0 and V3<0 and |V2|>A and |V3|>A
c8: V2<0 and V3>0 and |V2|<A and |V3|<A The zero-crossing c1 occurs when the first magnetic sensor 21 senses a portion near the boundary between the magnetic pole M8 and the magnetic pole M1. When the value of the first output signal V1 changes from a positive value to a negative value through the time point at which the zero-crossing c1 is detected (immediately preceding value≥0 and current value<0), it is determined that the magnetic pole sensed by the first magnetic sensor 21 shifts from M1 to M8. Thus, in this case, the magnetic pole sensed by the first magnetic sensor 21 is identified as M8 (the magnetic pole having a smaller pole number between the two consecutive magnetic poles). On the other hand, when the value of the first output signal V1 changes from a negative value to a positive value through the time point at which the zero-crossing c1 is detected (immediately preceding value<0 and current value≥0), it is determined that the magnetic pole sensed by the first magnetic sensor 21 shifts from M8 to M1. Thus, in this case, the magnetic pole sensed by the first magnetic sensor 21 is identified as M1 (the magnetic pole having a larger pole number between the two consecutive magnetic poles).

Similarly, for the zero-crossings c3, c5 and c7 as well, when the value of the first output signal V1 changes from a positive value to a negative value through the time point at which the zero-crossing is detected, it is determined that the magnetic pole sensed by the first magnetic sensor 21 is the magnetic pole having a smaller pole number between the two consecutive magnetic poles; whereas, when the first output signal V1 changes from a negative value to a positive value, it is determined that the magnetic pole sensed by the first magnetic sensor 21 is the magnetic pole having a larger pole number between the two consecutive magnetic poles.

The zero-crossing c2 occurs when the first magnetic sensor 21 senses a portion near the boundary between the magnetic pole M1 and the magnetic pole M2. When the first output signal V1 changes from a positive value to a negative value through the time point at which the zero-crossing c2 is detected (immediately preceding value>0 and current value≤0), it is determined that the magnetic pole sensed by the first magnetic sensor 21 shifts from M1 to M2. Thus, in this case, the magnetic pole sensed by the first magnetic sensor 21 is identified as M2 (the magnetic pole having a larger pole number between the two consecutive magnetic poles). On the other hand, when the value of the first output signal V1 changes from a negative value to a positive value through the time point at which the zero-crossing c2 is detected (immediately preceding value≤0 and current value>0), it is determined that the magnetic pole sensed by the first magnetic sensor 21 shifts from M2 to M1. Thus, in this case, the magnetic pole sensed by the first magnetic sensor 21 is identified as M1 (the magnetic pole having a smaller pole number between the two consecutive magnetic poles).

Similarly, for the zero-crossings c4, c6 and c8 as well, when the value of the first output signal V1 changes from a positive value to a negative value through the time point at which the zero-crossing is detected, it is determined that the magnetic pole sensed by the first magnetic sensor 21 is the magnetic pole having a larger pole number between the two consecutive magnetic poles; whereas, when the first output signal V1 changes from a negative value to a positive value, it is determined that the magnetic pole sensed by the first magnetic sensor 21 is the magnetic pole having a smaller pole number between the two consecutive magnetic poles.

Thus, the relationship between the combination of the value of the second output signal V2, the value of the third output signal V3 and the manner in which the first output signal V1 changes, and the magnetic pole sensed by the first magnetic sensor 21 (transition in magnetic pole) in the case where the output signal for which the zero-crossing has been detected is the first output signal V1 is expressed by Table 3A, Table 3B, Table 4A and Table 4B.

TABLE 3A

V2 > 0 AND V3 < 0 (V1: POSITIVE → NEGATIVE)

| | | V3 | |
|---|---|---|---|
| | | |V3| > A | |V3| < A |
| V2 | |V2| > A | M7 → M6 | M3 → M2 |
| | |V2| < A | M1 → M8 | M5 → M4 |

TABLE 3B

V2 < 0 AND V3 > 0 (V1: POSITIVE → NEGATIVE)

| | | V3 | |
|---|---|---|---|
| | | |V3| > A | |V3| > A |
| V2 | |V2| > A | M5 → M6 | M3 → M4 |
| | |V2| < A | M1 → M2 | M7 → M8 |

TABLE 4A

V2 > 0 AND V3 < 0 (V1: NEGATIVE → POSITIVE)

| | | V3 | |
|---|---|---|---|
| | | |V3| > A | |V3| < A |
| V2 | |V2| > A | M6 → M7 | M2 → M3 |
| | |V2| < A | M8 → M1 | M4 → M5 |

TABLE 4B

V2 < 0 AND V3 > 0 (V1: NEGATIVE → POSITIVE)

| | | V3 | |
|---|---|---|---|
| | | |V3| > A | |V3| < A |
| V2 | |V2| > A | M6 → M5 | M4 → M3 |
| | |V2| < A | M2 → M1 | M8 → M7 |

Table 3A and Table 3B are adapted to the case where the first output signal V1 changes from a positive value to a negative value through zero-crossing. Table 3A shows the relationship between the combination of the magnitude of the absolute value of V2 (whether V2 is larger than or smaller than the threshold A) and the magnitude of the absolute value of V3 (whether V3 is larger than or smaller than the threshold A) and the magnetic pole sensed by the first magnetic sensor 21 in the case where V2>0 and V3<0. In Table 3A, for example, "M7→M6" indicates that the magnetic pole sensed by the first magnetic sensor 21 shifts from M7 to M6, On the other hand, Table 3B shows the relationship between the combination of the magnitude of the absolute value of V2 and the magnitude of the absolute value of V3 and the magnetic pole sensed by the first magnetic sensor 21 in the case where V2<0 and V3>0.

Table 4A and Table 4B are adapted to the case where the first output signal V1 changes from a negative value to a positive value through zero-crossing. Table 4A shows the relationship between the combination of the magnitude of the absolute value of V2 (whether V2 is larger than or smaller than the threshold A) and the magnitude of the absolute value of V3 (whether V3 is larger than or smaller than the threshold A) and the magnetic pole sensed by the first magnetic sensor 21 in the case where V2>0 and V3<0. On the other hand, Table 4B shows the relationship between the combination of the magnitude of the absolute value of V2 and the magnitude of the absolute value of V3 and the magnetic pole sensed by the first magnetic sensor 21 in the case where V2<0 and V3>0.

When the output signal for which the zero-crossing has been detected is the first output signal V1, the rotation angle computing device 20 identifies the pole number q1 of the magnetic pole sensed by the first magnetic sensor 21 based on the relationship between the combinations of the value of the second output signal V2, the value of the third output signal V3 and the manner in which the first output signal V1 changes and the magnetic pole sensed by the first magnetic sensor 21, shown by Table 3A, Table 3B, Table 4A and Table 4B, the values of the first, second and third output signals V1, V2 and V3 read in the current computation cycle and the immediately preceding value of the first output signal V1.

When the pole number q1 of the magnetic pole sensed by the first magnetic sensor 21 is identified through the first magnetic pole identifying process, the rotation angle computing device 20 executes second magnetic pole identifying process. In the second magnetic pole identifying process, the rotation angle computing device 20 identifies the pole number q2 of the magnetic pole sensed by the second magnetic sensor 22 based on the pole number q1 of the magnetic pole sensed by the first magnetic sensor 21 and the first and second relative pole numbers r1 and r2. Specifically, the rotation angle computing device 20 identifies the pole number q2 of the magnetic pole sensed by the second magnetic sensor 22 based on q2=(q1−r1)+r2.

In addition, the rotation angle computing device 20 identifies the pole number q3 of the magnetic pole sensed by the third magnetic sensor 23 based on the pole number q1 of the magnetic pole sensed by the first magnetic sensor 21 and the first and third relative pole numbers r1 and r3. Specifically, the rotation angle computing device 20 identifies the pole number q3 of the magnetic pole sensed by the third magnetic sensor 23 based on q3=(q1−r1)+r3.

When the pole numbers q1, q2 and q3 of the magnetic poles respectively sensed by the magnetic sensors 21, 22 and 23 are identified through the second magnetic pole identifying process, the process proceeds to step S7 of FIG. 5. In step S7, the rotation angle computing device 20 executes amplitude correction process. That is, when the pole numbers q1, q2 and q3 of the magnetic poles respectively sensed by the magnetic sensors 21, 22 and 23 have been identified, the rotation angle computing device 20 corrects the amplitudes of the output signals V1, V2 and V3 of the respective magnetic sensors 21, 22 and 23. On the other hand, when the pole numbers q1, q2 and q3 of the magnetic poles respectively sensed by the magnetic sensors 21, 22 and 23 have not been identified, the rotation angle computing device 20 causes the process to proceed to step S8 without executing the amplitude correction process.

When the pole numbers q1, q2 and q3 of the magnetic poles respectively sensed by the magnetic sensors 21, 22 and 23 have been identified, the rotation angle computing device 20 acquires the peak value of the first output signal V1 corresponding to the pole number q1 of the magnetic pole sensed by the first magnetic sensor 21, the peak value of the second output signal V2 corresponding to the pole number q2 of the magnetic pole sensed by the second magnetic sensor 22 and the peak value of the third output signal V3 corresponding to the pole number q3 of the magnetic pole sensed by the third magnetic sensor 23 from the peak value table (see FIG. 4). The peak values of the first, second and third output signals V1, V2 and V3, acquired from the peak value table, are respectively denoted by P1$x$, P2$x$ and P3$x$. Then, the amplitudes of the output signals V1, V2 and V3 are corrected based on the acquired peak values (amplitude correction values) P1$x$, P2$x$ and P3$x$ and a preset reference amplitude $\phi$.

Specifically, when signals obtained by correcting the amplitudes of the first, second and third output signals V1, V2 and V3 are respectively denoted by V1', V2' and V3', the corrected first, second and third output signals V1', V2' and V3' are respectively computed based on Equations 2, 3, and 4 below.

$$V1'=(V1/P1x)\times\phi \qquad \text{Equation 2}$$

$$V2'=(V2/P2x)\times\phi \qquad \text{Equation 3}$$

$$V3'=(V3/P3x)\times\phi \qquad \text{Equation 4}$$

When the amplitude correction process ends, the rotation angle computing device 20 causes the process to proceed to step S8. In step S8, the rotation angle computing device 20 computes the electric angle $\theta e$ based on the output signals V1', V2' and V3' of which the amplitudes are corrected in step S7 (corrected output signals V1', V2' and V3'). Note that, when no amplitude correction is performed in step S7, the electric angle $\theta e$ is computed based on the values of the output signals V1, V2 and V3 read in step S1.

Hereinafter, the case where the electric angle $\theta e$ is computed based on the corrected output signals V1', V2' and V3' will be described. Note that, when the electric angle $\theta e$ is computed based on the values of the output signals V1, V2 and V3 read in step S1, the values of the output signals V1, V2 and V3 are used in place of the corrected output signals V1', V2' and V3', so the description thereof is omitted.

The rotation angle computing device 20 computes the first electric angle $\theta e1$ corresponding to the rotation angle of the rotor 1 based on the corrected first output signal V1' and the corrected second output signal V2'. In addition, the rotation angle computing device 20 computes the second electric angle $\theta e2$ corresponding to the rotation angle of the rotor 1 based on the corrected first output signal V1' and the corrected third output signal V3'. In addition, the rotation angle computing device 20 computes the third electric angle $\theta e3$ corresponding to the rotation angle of the rotor 1 based on the corrected second output signal V2' and the corrected third output signal V3'. A method of computing the first, second and third electric angles $\theta e1$, $\theta e2$ and $\theta e3$ will be described later.

Then, the rotation angle computing device 20, for example, computes the final electric angle $\theta e$ based on Equation 5 below. That is, the rotation angle computing device 20 computes the mean value of the first, second and third electric angles $\theta e1$, $\theta e2$ and $\theta e3$ as the final electric angle $\theta e$.

$$\theta e=(\theta e1+\theta e2+\theta e3)/3 \qquad \text{Equation 5}$$

Note that the rotation angle computing device 20 may compute the median value of the first, second and third electric angles $\theta e1$, $\theta e2$ and $\theta e3$ as the final electric angle $\theta e$. In addition, the rotation angle computing device 20 may exclude one of the first, second and third electric angles $\theta e1$, $\theta e2$ and $\theta e3$, which is more deviated from the median value thereof than the other, and compute the mean value of the two values other than the excluded one as the final electric angle $\theta e$. Furthermore, the rotation angle computing device 20 may determine one of the first, second and third electric angles $\theta e1$, $\theta e2$ and $\theta e3$ as the final electric angle $\theta e$.

A method of computing the first electric angle $\theta e1$ will be described. Because the reference amplitude is $\phi$, the corrected first output signal V1' is expressed by $\phi \cdot \sin \theta e$, the corrected second output signal V2' is expressed by $\phi \cdot \sin(\theta e+120°)$, and the corrected third output signal V3' is expressed by $\phi \cdot \sin(\theta e+240°)$. Here, for the sake of convenience of description, the reference amplitude $\phi$ is 1, and the corrected first output signal V1', the corrected second output signal V2' and the corrected third output signal V3' are respectively expressed by V1'=sin θe, V2'=sin(θe+120°) and V3'=sin(θe+240°).

The rotation angle computing device 20 initially computes a signal $V_{12}{'}$ (=sin(θe+90°)=cos θe), of which the phase difference from the corrected first output signal V1' is 90°, based on the corrected first output signal V1' (=sin θe) and the corrected second output signal V2' (=sin(θe+120°)). More specifically, the rotation angle computing device 20 computes the signal $V_{12}{'}$ based on Equation 6 below.

$$V'_{12} = \cos\theta e \quad (6)$$
$$= \frac{\sin(\theta e + 120°) - \sin\theta e \cdot \cos 120°}{\sin 120°}$$
$$= \frac{V2' - V1' \cdot \cos 120°}{\sin 120°}$$
$$= \frac{2 \cdot V2' + V1'}{\sqrt{3}}$$

Equation 6 is derived based on the equation expanded from sin(θe+120°) by the addition theorem of trigonometric function. Then, the rotation angle computing device 20 computes the first electric angle θe1 using the signal $V_{12}{'}$ (=cos θe) and the corrected first output signal V1' (=sin θe) based on Equation 7 below.

$$\theta e1 = \tan^{-1}\frac{\sin\theta e}{\cos\theta e} \quad (7)$$
$$= \tan^{-1}\frac{V1'}{V'_{12}}$$

A method of computing the second electric angle θe2 will be described. The rotation angle computing device 20 initially generates a signal $V_{13}{'}$ (=sin(θe+90°)=cos θe), of which the phase difference from the corrected first output signal V1' is 90°, based on the corrected first output signal V1' (=sin θe) and the corrected third output signal V3' (=sin(θe+240°)). More specifically, the rotation angle computing device 20 generates the signal $V_{13}{'}$ based on Equation 8 below.

$$V'_{13} = \cos\theta e \quad (8)$$
$$= \frac{\sin(\theta e + 240°) - \sin\theta e \cdot \cos 240°}{\sin 240°}$$
$$= \frac{V3' - V1' \cdot \cos 240°}{\sin 240°}$$
$$= \frac{-2 \cdot V3' - V1'}{\sqrt{3}}$$

Equation 8 is derived based on the equation expanded from sin(θe+240°) by the addition theorem of trigonometric function. Then, the rotation angle computing device 20 computes the second electric angle θe2 using the signal $V_{13}{'}$ (=cos θe) and the corrected first output signal V1' (=sin θe) based on Equation 9.

$$\theta e2 = \tan^{-1}\frac{\sin\theta e}{\cos\theta e} \quad (9)$$
$$= \tan^{-1}\frac{V1'}{V'_{13}}$$

A method of computing the third electric angle θe3 will be described. The rotation angle computing device 20 initially computes the electric angle θe3' (=θe+120°), which is advanced by 120° with respect to the rotation angle (electric angle) θe of the rotor 1, based on the corrected second output signal V2' and the corrected third output signal V3'. Then, the third electric angle θe3 is computed by subtracting 120° from the obtained rotation angle θe3'.

The rotation angle computing device 20 generates a signal $V_{23}{'}$ (=sin(θe+120°±90°)), of which the phase difference from the corrected second output signal V2' is 90°, based on the corrected second output signal V2' (=sin(θe+120°)) and the corrected third output signal V3' (=sin(θe+240°)). Where θe'=θe+120°, the corrected second output signal V2' is expressed by the sinusoidal signal sin θe' and the corrected third output signal V3' is expressed by the sinusoidal signal sin(θe'+120°) which is advanced by 120° from the sinusoidal signal sin θe', the signal $V_{23}{'}$ (=sin(θe'+90°)=cos θe') of which the phase difference from the sinusoidal signal sin θe' is 90° is obtained as in the case of the method of computing the first electric angle θe1.

Specifically, the rotation angle computing device 20 generates the signal $V_{23}{'}$ based on Equation 10.

$$V'_{23} = \cos\theta e' \quad (10)$$
$$= \frac{\sin(\theta e' + 120°) - \sin\theta e' \cdot \cos 120°}{\sin 120°}$$
$$= \frac{\sin(\theta e + 240°) - \sin(\theta + 120°) \cdot \cos 120°}{\sin 120°}$$
$$= \frac{V3' - V2' \cdot \cos 120°}{\sin 120°}$$
$$= \frac{2 \cdot V3' + V2'}{\sqrt{3}}$$

Subsequently, the rotation angle computing device 20 computes the rotation angle θe3' using the signal $V_{23}{'}$ (=cos θe') and the corrected second output signal V2' (=sin θe'=sin(θe+120°)) based on Equation 11 below.

$$\theta e3' = \tan^{-1}\frac{\sin\theta e'}{\cos\theta e'} \quad (11)$$
$$= \tan^{-1}\frac{V2'}{V'_{23}}$$

Then, the rotation angle computing device 20 computes the third electric angle θe3 based on Equation 12 below.

$$\theta e3 = \theta e3' - 120° \qquad \text{Equation 12}$$

When the electric angle θe is computed in step S8, the rotation angle computing device 20 gives the electric angle θe to the motor controller 30. Then, the process in the current computation cycle ends.

Figure 11:
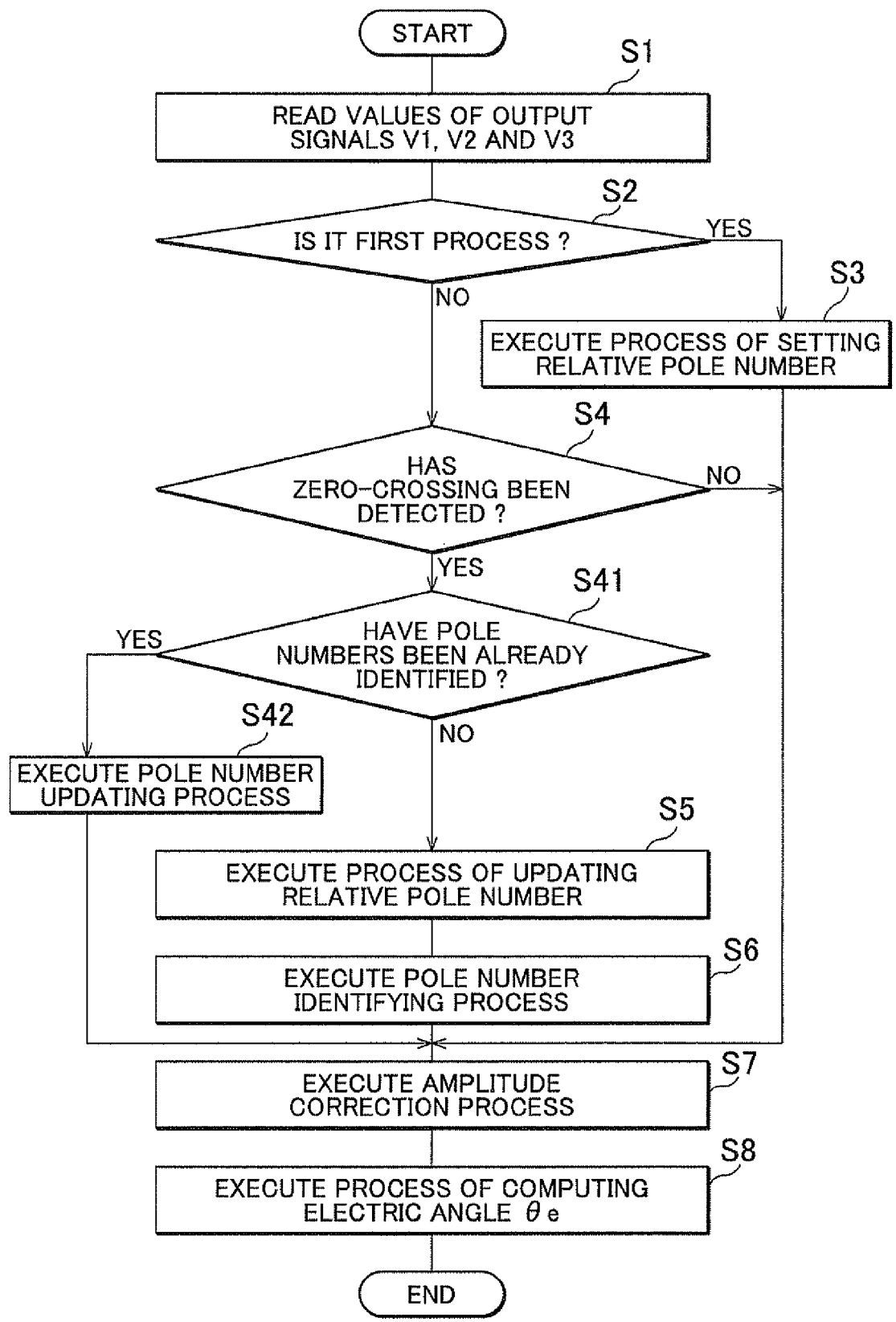
FIG. 11 is a flowchart that shows another example of rotation angle computing process executed by the rotation angle computing device.
Figure 12:
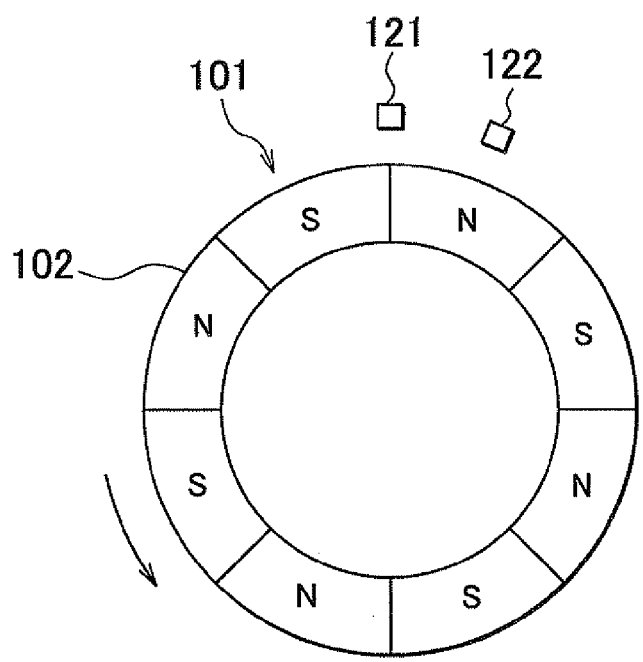
FIG. 12 is a schematic view for illustrating a rotation angle detecting method executed by a conventional rotation angle detection device.
Figure 13:
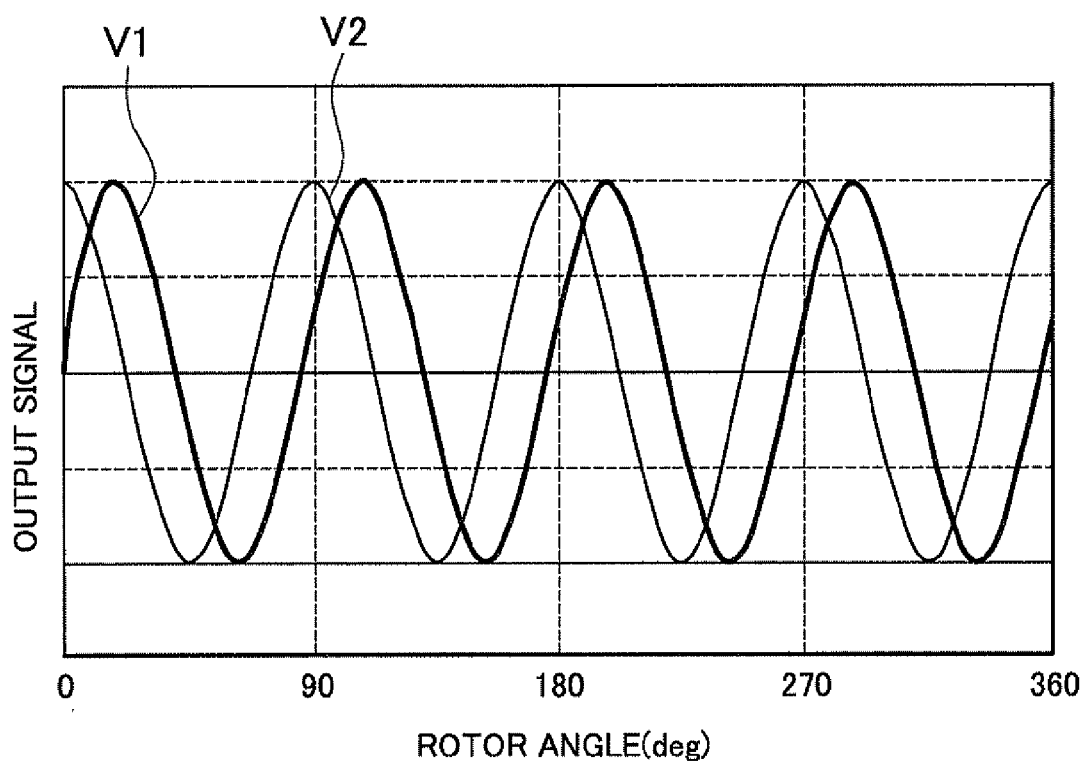
FIG. 13 is a chart that shows the output signal waveform of a first magnetic sensor and the output signal waveform of a second magnetic sensor.

FIG. 11 is a flowchart that shows another example of rotation angle computing process executed by the rotation angle computing device. In FIG. 11, like reference signs denote steps in which similar processes as those of the steps shown in FIG. 5 are executed. The rotation angle computing process shown in FIG. 11 differs from the rotation angle computing process shown in FIG. 5 in that step S41 and step S42 are added.

When the zero-crossing of one of the values of the output signals V1, V2 and V3 has been detected in step S4 (YES in step S4), the rotation angle computing device 20 determines whether the magnetic poles respectively sensed by the magnetic sensors 21, 22 and 23 have been already identified through the pole number identifying process of step S6 (step S41). When the magnetic poles respectively sensed by the magnetic sensors 21, 22 and 23 have not been identified (NO in step S41), the process proceeds to step S5.

On the other hand, when the magnetic poles respectively sensed by the magnetic sensors 21, 22 and 23 have been already identified (YES in step S41), the rotation angle computing device 20 executes pole number updating process (step S42). Specifically, the rotation angle computing device 20 changes the pole number q1, q2 or q3 that has been already identified for the magnetic sensor that outputs the output signal for which the zero-crossing has been detected through the zero-crossing detecting process of step S4, to a pole number that is larger by one or a pole number that is smaller by one based on the rotation direction of the rotor 1.

When the rotation direction of the rotor 1 is the forward direction, the rotation angle computing device 20 updates the pole number q1, q2 or q3 that has been already identified for the magnetic sensor that outputs the output signal for which the zero-crossing has been detected, to a pole number larger by one. On the other hand, when the rotation direction of the rotor 1 is the reverse direction, the rotation angle computing device 20 updates the pole number q1, q2 or q3 that has been already identified for the magnetic sensor that outputs the output signal for which the zero-crossing has been detected, to a pole number smaller by one. Note that, the pole number smaller by one than the pole number "1" is "8". In addition, the pole number larger by one than the pole number "8" is "1". When the process of step S42 ends, the process proceeds to step S7.

According to the embodiment, the rotation angle computing device 20 is able to compute the electric angle θe in each predetermined computation cycle and to give the computed electric angle θe to the motor controller 30. In addition, the rotation angle computing device 20 is able to identify the magnetic poles respectively sensed by the magnetic sensors 21, 22 and 23 when the zero-crossing of one of the first output signal V1, the second output signal V2 and the third output signal V3 has been detected after the start of rotation angle computing process. Thus, after the start of rotation angle computing process, it is possible to identify the magnetic poles respectively sensed by the magnetic sensors 21, 22 and 23 after the rotor 1 (brushless motor) starts rotating and before one rotation of the rotor 1 is completed. That is, after the start of rotation angle computing process, it is possible to identify the magnetic poles respectively sensed by the magnetic sensors 21, 22 and 23 in an early stage immediately after the rotor 1 starts rotating.

More specifically, in the embodiment, there are eight zero-crossings of each of the output signals V1, V2 and V3 during one rotation of the rotor 1. Thus, there are total of twenty-four zero-crossings of the output signals V1, V2 and V3 during one rotation of the rotor 1. Therefore, after the start of rotation angle computing process, when the rotor 1 rotates at least 15° (=360/24) in mechanical angle, it is possible to identify the magnetic poles respectively sensed by the magnetic sensors 21, 22 and 23.

The embodiment of the invention is described above; however, the invention may be modified into another embodiment. For example, in the above-described embodiment, the threshold A used to identify the zero-crossings a1 to a8, b1 to b8, and c1 to c8 (see FIG. 8, FIG. 9 and FIG. 10) is a constant value; instead, because the amplitudes of the output signals of the respective magnetic sensors 21, 22 and 23 vary depending on an ambient temperature, the threshold A may be changed based on the ambient temperature. Specifically, the amplitudes of the output signals of the respective magnetic sensors 21, 22 and 23 reduce as the ambient temperature increases, so the threshold A may also be changed so as to reduce as the ambient temperature increases.

In addition, the magnetic pole identifying process for identifying the magnetic poles respectively sensed by the magnetic sensors 21, 22 and 23 is executed each time the zero-crossing of each the three output signals V1, V2 and V3 has been detected; instead, the magnetic pole identifying process for identifying the magnetic poles respectively sensed by the magnetic sensors may be executed at the time when the zero-crossing of one or two predetermined output signals among the three output signals V1, V2 and V3 has been detected.

In addition, the number of the magnetic poles, the number of the magnetic sensors, the arrangement pattern of the magnetic pole pairs having a weak magnetic force and the magnetic pole pairs having a strong magnetic force and the arrangement positions of the magnetic sensors are not limited to the ones described in the above embodiment. That is, the number of the magnetic poles, the number of the magnetic sensors, the arrangement pattern of the magnetic pole pairs having a weak magnetic force and the magnetic pole pairs having a strong magnetic force and the arrangement positions of the magnetic sensors may be set such that, at the time when the timing of the zero-crossing of the output signal of one of the magnetic sensors has been detected, the combination of the values of the output signals of the other two magnetic sensors differs among the magnetic poles sensed by the first magnetic sensor 21.

In addition, the invention may be applied to the case where the rotation angle of a rotor, other than the rotor of the brushless motor, is detected. For example, the invention may also be applied to a rotation angle detection device for detecting the rotation angle of each of two shafts coupled to each other by a torsion bar spring in a torque detecting device that detects a torque applied to one of the two shafts based on a rotation angle difference between the two shafts.

Other than the above, various design changes may be applied within the range of the matter recited in the appended claims.

What is claimed is:

1. A rotation angle detection device that detects a rotation angle of a rotor, comprising:
   a multi-polar magnet that rotates with rotation of the rotor, and that has at least one magnetic pole having a first magnetic force and at least one magnetic pole having a second magnetic force;
   first, second and third magnetic sensors that respectively output first, second and third sinusoidal output signals having a predetermined phase difference with rotation of the multi-polar magnet;
   a zero-crossing detecting unit that detects timing of a zero-crossing of an output signal of at least one of the first, second and third magnetic sensors; and
   a magnetic pole identifying unit that, when the timing of the zero-crossing of the output signal of the one of the magnetic sensors has been detected by the zero-crossing detecting unit, identifies a magnetic pole, sensed by the first magnetic sensor, based on output signals of the other two magnetic sensors, wherein
   an arrangement pattern of the at least one magnetic pole having the first magnetic force and the at least one magnetic pole having the second magnetic force and the phase difference are set such that, when the timing of the zero-crossing of the output signal of the one of the magnetic sensors has been detected by the zero-crossing detecting unit, a combination of values of the output signals of the other two magnetic sensors differs among the magnetic poles sensed by the first magnetic sensor.

2. The rotation angle detection device according to claim 1, further comprising:
- a magnetic pole determination unit that determines the magnetic pole sensed by at least one of the second and third magnetic sensors based on the magnetic pole identified by the magnetic pole identifying unit;
- a first amplitude correction unit that corrects an amplitude of the output signal of the first magnetic sensor based on the magnetic pole identified by the magnetic pole identifying unit;
- a second amplitude correction unit that corrects an amplitude of the output signal of the at least one of the second and third magnetic sensors based on the magnetic pole determined by the magnetic pole determination unit; and
- a rotation angle computing unit that detects the rotation angle of the rotor based on the output signal of which the amplitude is corrected by the first amplitude correction unit and the output signal of which the amplitude is corrected by the second amplitude correction unit.

3. The rotation angle detection device according to claim 1, wherein
the predetermined phase difference is 120 degrees in electric angle.

4. The rotation angle detection device according to claim 2, wherein
the predetermined phae difference is 120 degrees in electric angle.

5. The rotation angle detection device according to claim 2, wherein the first amplitude correction unit and the second amplitude correction unit correct the amplitude of the output signals of the first magnetic sensor, the second magnetic sensor and the third magnetic sensor based on peak values of the first magnetic sensor, the second magnetic sensor and the third magnetic sensors acquired from the peak value table and a preset reference amplitude.

* * * * *